US008996682B2

(12) United States Patent
Stevenson et al.

(10) Patent No.: US 8,996,682 B2
(45) Date of Patent: Mar. 31, 2015

(54) AUTOMATICALLY INSTRUMENTING A SET OF WEB DOCUMENTS

(75) Inventors: Daniel C. Stevenson, Dublin (IE); Olivier Dabrowski, Blackrock (IE); Kresimir Bozic, Dublin (IE); Dan Teodosiu, Dublin (IE); Paolo Severini, Dublin (IE); Cristian Costache, Dublin (IE); Euan Grant, Redmond, WA (US); Erik Zigman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

(21) Appl. No.: 11/871,831

(22) Filed: Oct. 12, 2007

(65) Prior Publication Data

US 2009/0100154 A1 Apr. 16, 2009

(51) Int. Cl.

*G06F 15/173* (2006.01)
*G06Q 30/02* (2012.01)
*G06F 17/30* (2006.01)
*H04L 29/08* (2006.01)

(52) U.S. Cl.

CPC ............ *G06Q 30/02* (2013.01); *G06F 17/3089* (2013.01); *H04L 67/025* (2013.01); *H04L 67/22* (2013.01)
USPC .......................................................... 709/224

(58) Field of Classification Search

CPC ... H04L 67/025; H04L 41/5096; H04L 43/06; H04L 67/22; G06F 17/3089
USPC .................................................. 709/220, 224
See application file for complete search history.

(56) References Cited

U.S. PATENT DOCUMENTS

| | | | | |
|---|---|---|---|---|
| 5,991,740 A * | 11/1999 | Messer | ...................... | 705/14.29 |
| 5,999,912 A | 12/1999 | Wodarz et al. | | |
| 6,061,700 A * | 5/2000 | Brobst et al. | .................. | 715/206 |

(Continued)

FOREIGN PATENT DOCUMENTS

| | | |
|---|---|---|
| EP | 1030504 A2 | 8/2000 |
| KR | 20020018912 A | 3/2002 |

(Continued)

OTHER PUBLICATIONS

Patent Cooperation Treaty; International Searching Authority; Apr. 13, 2009, 13 pages.

(Continued)

*Primary Examiner* — Aaron Strange
(74) *Attorney, Agent, or Firm* — Joann Dewey; Doug Barker; Micky Minhas

(57) ABSTRACT

Embodiments of the invention provide a method and system for automatically instrumenting a set of web documents, such as web pages, as well as embedding structures that present advertising content via the web pages. The instrumentation automatically embeds tags that enable usage information associated with the web documents to be tracked and recorded. Many hundreds or thousands of web pages can be automatically modified without user intervention, enabling comprehensive reporting and tracking to be performed on each page. The web pages are analyzed and insertion points intelligently located. Changes can be verified to ensure that no undesirable effects resulted from embedding the content. The tags can receive parameters customized to the level of users and pages. The tags, insertion information, and other configuration information can be stored in a central repository to make subsequent tagging easier.

21 Claims, 20 Drawing Sheets

(56) References Cited

U.S. PATENT DOCUMENTS

| | | | | |
|---|---|---|---|---|
| 6,266,681 | B1 | 7/2001 | Guthrie | |
| 6,366,298 | B1 * | 4/2002 | Haitsuka et al. | 715/736 |
| 6,877,007 | B1 * | 4/2005 | Hentzel et al. | 709/224 |
| 7,003,565 | B2 * | 2/2006 | Hind et al. | 709/224 |
| 7,047,318 | B1 | 5/2006 | Svedloff | |
| 7,107,309 | B1 * | 9/2006 | Geddes et al. | 709/203 |
| 7,117,436 | B1 * | 10/2006 | O'Rourke et al. | 715/205 |
| 7,185,085 | B2 * | 2/2007 | Bean | 709/224 |
| 7,720,432 | B1 * | 5/2010 | Colby et al. | 455/3.02 |
| 2001/0054048 | A1 * | 12/2001 | Kelsey | 707/513 |
| 2002/0099818 | A1 * | 7/2002 | Russell et al. | 709/224 |
| 2002/0143933 | A1 * | 10/2002 | Hind et al. | 709/224 |
| 2003/0018752 | A1 * | 1/2003 | Lowy | 709/219 |
| 2003/0023755 | A1 * | 1/2003 | Harris et al. | 709/246 |
| 2003/0191817 | A1 * | 10/2003 | Fidler | 709/219 |
| 2004/0015608 | A1 * | 1/2004 | Ellis et al. | 709/246 |
| 2004/0059809 | A1 | 3/2004 | Benedikt et al. | |
| 2004/0130634 | A1 * | 7/2004 | Delaney et al. | 348/231.99 |
| 2004/0205119 | A1 * | 10/2004 | Streble et al. | 709/203 |
| 2004/0261023 | A1 * | 12/2004 | Bier | 715/530 |
| 2005/0049960 | A1 | 3/2005 | Yeager | |
| 2006/0064471 | A1 | 3/2006 | Hewett et al. | |
| 2006/0155780 | A1 | 7/2006 | Sakairi et al. | |
| 2006/0294199 | A1 | 12/2006 | Bertholf | |
| 2006/0294500 | A1 * | 12/2006 | Chiang | 717/109 |
| 2007/0011248 | A1 | 1/2007 | Kalervo et al. | |
| 2007/0055755 | A1 | 3/2007 | Sasnett | |
| 2007/0180013 | A1 * | 8/2007 | Yung | 708/446 |
| 2007/0180147 | A1 | 8/2007 | Leigh | |
| 2007/0204219 | A1 | 8/2007 | Foulger | |
| 2007/0234207 | A1 * | 10/2007 | Turakhia | 715/530 |
| 2007/0271501 | A1 * | 11/2007 | Vasilik | 715/511 |
| 2009/0063491 | A1 * | 3/2009 | Barclay et al. | 707/9 |

FOREIGN PATENT DOCUMENTS

| | | | |
|---|---|---|---|
| KR | 20030060849 | A | 7/2003 |
| WO | 2005065237 | A2 | 7/2005 |

OTHER PUBLICATIONS

Instruction for Updating Websites to Include Quicktime Content, http://developer.apple.com/internet/ieembedprep.html.

HTML the Definitive Guide, http://www.unix.org.ua/orelly/web/html/ch13_02.html.

Introducing the PNW Topic Hotlist, http://www.topichotlist.com/th/pnwjavascripttag.shtml.

Perl Script to Add Google Analytics Code to Your Website Pages, http://herselfswebtools.com/2007/07/perl-script-to-add-google-analytics-code-to-your-website-pages.html , "? Jul. 2007 ?".

Globalization Step-by-Step, http://www.microsoft.com/globaldev/getwr/steps/wrg_codepage.mspx.

EP Search Report dated Jun. 15, 2012 regarding PCT/US2008077315, 9 pages.

Atterer, et al., "Knowing the User's Every Move—User Activity Tracking for Website Usability Evaluation and Implicit Interaction," WWW 2006 Proceedings of the 15th International Conference on World Wide Web, ACM, New York, NY, May 22, 2006, pp. 203-212, XP002519605, DOI: 10.1145/1135777.1135811, ISBN: 978-1-59593-323-2.

Atterer et al., "Knowing the User's Every Move—User Activity Tracking for Website Usability Evaluation and Implicit Interaction" International World Wide Web Congerence Committee (JW3C2), WWW 2006, May 23-26, 2006, XP-002519605, pp. 203-212.

European Office Action dated Jul. 9, 2013 in Application No. 08 839 655.1-1955; 6 pages.

PCT Notice on the First Office Action dated Sep. 19, 2011 regarding PCT Appln. No. 200880111437.5 7 pages.

* cited by examiner

```
<SCRIPT LANGUAGE="JAVASCRIPT" TYPE="TEXT/JAVASCRIPT" SRC="HTTP://X.LIVE.COM/ANALYTICS/MSANALYTICS.JS">
</SCRIPT>
<SCRIPT LANGUAGE="JAVASCRIPT" TYPE="TEXT/JAVASCRIPT">
  MSANALYTICS.PROFILEID = '12345ABCDEF'
  MSANALYTICS.TRACKPAGE();
</SCRIPT>
```

```
<SCRIPT SRC="HTTPS://SSL.GOOGLE-ANALYTICS.COM/URCHIN.JS" TYPE="TEXT/JAVASCRIPT">
</SCRIPT>
<SCRIPT TYPE="TEXT/JAVASCRIPT">_UACCT = "UA-723192-1";URCHINTRACKER();
</SCRIPT>
```

```
<SCRIPT SRC="ABC" TYPE="WHATEVER_TYPE">
</SCRIPT>
<SCRIPT TYPE="WHATEVER_TYPE">_UACCT = "IDENTIFIER";[TRACKER_REFERENCE]();
</SCRIPT>
```

```
<SCRIPT TYPE="TEXT/JAVASCRIPT"><!—
 AD_CLIENT = "PUB-2368963214925656";
 AD_WIDTH = 728;
 AD_HEIGHT = 90;
 AD_FORMAT = "728X90_AS";
 AD_TYPE = "TEXT_IMAGE";
 AD_CHANNEL = ""; // ONE PARAMETER FOR STATIC AND DYNAMIC CHANNEL ASSOCIATIONS
 COLOR_BORDER = "FFFFFF";
 COLOR_BG = "000000";
 COLOR_LINK = "000000";
 COLOR_TEXT = "000000";
 COLOR_URL = "008000";
 //-->
</SCRIPT>

<SCRIPT TYPE="TEXT/JAVASCRIPT"
  SRC="HTTP://PAGEAD2.XYZ.COM/DELIVERY/GETADS.JS">
</SCRIPT>
```

*FIG. 1E.*

AUTOMATICALLY INSTRUMENTING A SET OF WEB DOCUMENTS

SUMMARY

The invention is defined by the claims below, but summarily, embodiments of the invention include systems and methods of automatically instrumenting a set of documents, typically web pages. We explain "instrumenting," in greater detail below, but summarily it refers to the process of modifying—via the insertion of customized executable code, content, or advertising—a document or a specific set of related documents (such as a set of web pages that are part of an e-commerce purchase process, or one of several experimental variations on a website layout), so that actions taken by end users with respect to that document are transmittable for recording, analysis, billing, and other business purposes. An embodiment of the present invention can instrument any number of pages, even hundreds or thousands of pages automatically.

Other illustrative aspects of the invention include facilitating smart validation of code insertion points, evaluation of the impact of tagging (inserting the code), parameterization of the tags based on user input or configuration (including technologies such as providing a profile id, page aliasing/nicknaming, events, e-commerce variables, etc.), the use of a central tag repository (e.g., 142) to maintain the integrity of instrumentation (which allows for simply undoing of changes), an ability to instrument/tag for A/B and multivariate testing applied across a specified set of documents, and the insertion of content ad blocks into pages that minimizes the negative impact on the page (appearance may change, but not function). This partial listing of aspects should not be construed as an indication that other aspects do not exist.

BRIEF DESCRIPTION OF THE SEVERAL VIEWS OF THE DRAWINGS

Embodiments of the invention are described in detail below with reference to the drawing figures, which form a part of this disclosure, and are incorporated by reference herein, and wherein:

FIGS. 1B-1E depict illustrative programmatic code that is to be embedded in a set of web pages according to an embodiment of the invention;

DETAILED DESCRIPTION

Figure 1A:
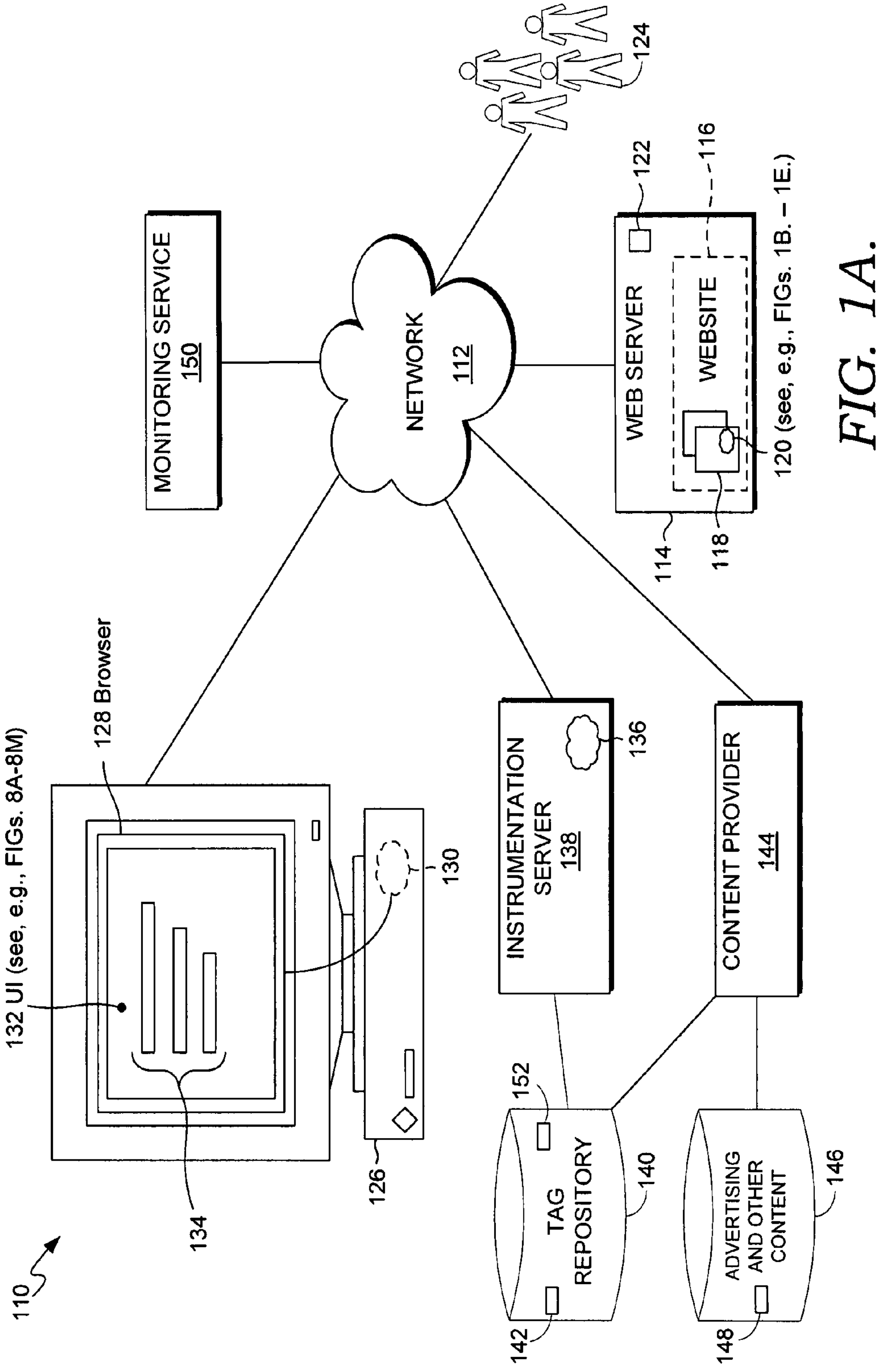
FIG. 1A. depicts an illustrative operating environment suitable for practicing an embodiment of the invention.

As briefly mentioned, one of the novel aspects of an embodiment of the instant invention is the ability to automatically insert web-analytics tags into documents (web pages, which may include text files, dynamically modifiable files, etc.), thereby simplifying a user's experience of inserting those tags in each page to be instrumented. In one embodiment tags take the form of delimited HTML and/or scripts (e.g., Javascripts and the like) that instrument the web pages; that is, enable web-page usage information associated with the web pages to be tracked. Some skilled artisans use various terms to capture the concept of instrumentation. For example, "web analytics" is sometimes referred to as "website instrumentation" by some web-analytics providers. An illustrative web-analytics provider is Omniture, Inc. (NASDAQ: OMTR, see also omniture.com). Many monitoring services such as those of Omniture exist. Performing monitoring services is not an overarching issue addressed by this invention. Rather, an aspect of the invention is concerned with equipping a website or set of web pages with the ability to be monitored. A home's security cannot be monitored until a security system is installed. While many vendors offer monitoring services, one of our concerns is akin to installing the security system itself; albeit in an automatic way.

Instrumentation of a website includes inserting web-analytics-related scripts into a web page. This technique will be variously referred to herein as "tagging" because what is inserted in web pages is code portions delimited by HTML tags. Tagging is not limited to inserting web analytics but can also include embedding content advertisements as well Thus, one aspect of the invention provides an efficient and automatic way to instrument a set of web pages so that users do not even need to edit a web page's source code. Often, the web pages make up website, but not always. Thus, when we discuss "instrumentation" or "instrumenting" a web page, we mean to refer to equipping a web page with the ability to have usage information of that web page monitored. Illustrative web-page usage information includes information about the behavior of website visitors 124 including visitation events (ways that people 124 interact with a web page), and can include, among other things, information about objects clicked on a web page, information about documents viewed, pages visited, information about downloads downloaded from a web page, information about controls activated on a web page, information about items interacted with by a user on a web page, information about media objects rendered by way of a web page, and the like. This allows website owners to view reports and other presentations that detail various aspects of usage of their website.

Implementing embodiments of the present invention in the context of content providers is as applicable to commerce providers inasmuch as embedding their ads into pages, and tracking the effectiveness of them, is desirable.

Turning now to FIG. 1, an illustrative operating environment suitable for practicing an embodiment of the present invention is provided and referenced generally by the numeral 110. As illustratively shown, various devices are coupled to each other directly or indirectly by way of a network 112. A web server 114 hosts a website 116 that is composed of various web pages. Not all web pages are shown. A portion of web pages is referenced by numeral 118. As will be explained in much greater detail below, the source code of some of these web pages will be modified so that, among other things, usage information can be tracked.

These modifications are represented by the cloud having reference numeral 120. That is, cloud 120 references the programmatic code (tagging structures) that is added to web pages 118 that allows various functional aspects to be realized, such as tracking usage information and providing advertising content. Illustrative examples of programmatic code/tags 120 is found in FIGS. 1B-1E. In some embodiments instrumentation code 120 facilitates web-page usage tracking. In other embodiments, instrumentation code 120 facilitates presenting advertising content.

Briefly turning to FIGS. 1B-1E, we presented mere examples of tags, or embeddable customized content. The syntax and formats can certainly vary. Box 160 of FIG. 1B illustrates a first example of web-analytics tagging. Box 162 of FIG. 1C shows another. FIG. 1D illustrates a more abstracted syntax, which illustrates a source indication 164, a type indication 166, a user identifier 168, a tracking reference 170, and a type indicator 172 that, in this case, is associated with identifier 168. These are not the only types of tags, but are examples. FIG. 1E depicts an illustrative advertising-related tag that provides visual information of the object to be embedded.

As will also be explained in greater detail below, web server 114 can be enhanced to include a notification client 122, which modifies web content on the fly in one embodiment so that as a web page is requested, it is modified in real time to include code 120 that is present at the time it is presented to a viewer 124. For the sake of simplicity, we will refer to web pages 118 by reference numeral 118 even though it may actually be the case that not all of the web pages will be modified. That is, in some cases, only a portion of web pages are modified.

To help illustrate an embodiment of the present invention, it will be assumed that website 116 is to be instrumented. That is, web pages 118 are to receive embedded content 120. Much of the present invention revolves around inserting or embedding programmatic code 120 that facilitates monitoring a web page. A website may be composed of several hundreds or even thousands of pages/documents. An embodiment of the present invention allows for an automated process to inspect an entire set of web pages, intelligently determine an insertion point to insert code 120 that will not affect the appearance on the website of the web page, select an appropriate tag, and insert it at the determined insertion point.

To do this, in one embodiment, a user utilizes a client machine 126 that has the ability to run a network browser 128. We will refer to client machine 126 as user 126 because it is an illustrative device that a user would use to instrument a website and to distinguish such a user of the invention from website viewers 124, who are website visitors. Network browser 128 can be an Internet browser, such as Firefox, Safari, Opera, Mozilla, Internet Explorer, or the like. A client-side application 130 presents a user interface 132 on computing device 126 by way of browser 128 in one embodiment. In one embodiment user interface 132 includes various screens and controls, which are generally referenced by numeral 134.

Client application 130 is a web-based client application in one embodiment. For example, client application 130 may take the form of an ActiveX control or similar. In other embodiments, it is a stand-alone executable or a plug-in/add-in that supplements a local software application such as a web-authoring tool that is used to create or manage websites. In one embodiment, client application 130 collaborates with a server-side application 136, which runs on a server 138, which we will refer to as an instrumentation server to help make referencing to it easier. In one embodiment, application 136 takes the form of computer-executable instructions that are embodied on one or more computer-readable media associated with instrumentation server 138. Computer-readable media is tangible. It is also conventional in nature; and as such, those of ordinary skill in the art would appreciate the fact that examples include magnetic-based storage media optical-based storage media, which are two illustrative types of media that are readable by a computing device, examples of which include instrumentation server 138 as well as client device 126 and web server 114. Of course it could take the form of a variety of computing devices such as a computer, laptop, etc. Instrumentation server 138 can be any computing device that performs the various functions that will be described herein. In some embodiments, server 138 includes a memory that makes available client application 130 to be accessed in real time, or downloaded and installed. This memory does not need to be associated with server 138, but could be in another location accessible by user 126.

In one embodiment, client application 130 works together with server-side application 136 to instrument website 116. In other embodiments, client application 130 can work directly with web server 114 to instrument website 116. In still other embodiments, client application 130 can instrument a set of web pages autonomously if it has access to them. Varying levels of interaction may be a function of situations such as whether website 116 is being instrumented for the first time as compared to whether its instrumentation is being updated, or if only a portion of web pages 118 are being modified. In other embodiments, instrumentation server 138 provides access to tag repository 140, which stores tags or information about tags that can be added to web pages 118. As previously mentioned, the term "tag" refers to a portion of code that is embedded in a web page that is delimited by HTML tags. Typically, a tag takes the form of a script. Illustrative tags 120 are shown in FIGS. 1B-1E, which are illustrative because the tags could take on a variety of forms. These tags do not need to be stored in repository 140 (which can be a third-party repository).

To help explain aspects of the present invention, reference numeral 142 refers to a specific tag in tag repository 140. Thus, in some cases programmatic code 120 is the same as tag 142. Although we use the term "specific tag," we do so only to mean that it refers to a code portion that is to be inserted into one or more web pages 118. That is, tag 142 may very will be different for different web pages. But assigning it a reference numeral will help explain different aspects of embodiments of the present invention. Reference numeral 142 will also be used to variously refer to "web analytics," or "scripts" which, as previously mentioned, are other terms used in the art to describe a portion of code that is added to a web page that allows various usage information to be tracked or content presented.

More than just embedding web analytics, the present invention can also embed code that exposes advertising content. In one embodiment, content provider 144 provides advertising and other content 146. Reference numeral 148 indicates a content tag or actual content that can be embedded into a web page 118. Content tag 148 may, in some cases, be housed in tag repository 142. An illustrative content tag is shown in FIG. 1E. Although schematically shown for reference purposes, tag repository 140 may reside within or be a part of instrumentation server 138. Similarly, advertising and other content 146 may form part of the same hardware that is referenced by numeral 144, a content provider.

After a website has been instrumented, a monitoring service 150 can monitor usage information associated with web pages 118. As mentioned, illustrative web-page usage information includes information about visits to a web page, objects clicked on a web page, documents viewed in a website, downloads downloaded from a web page, controls activated on a web page, items interacted with by a user on a web page, objects rendered by way of a web page, and the like. Examples of downloads that can be downloaded are legion; a few include: PDF files (forms, product manuals), installers for games or other applications, ring tones, music files such as MP3 and WMA songs, screen-saver applications, background "wallpaper" images, entire software applications, and anything else that can be downloaded.

Clearly, the aforementioned list is but a brief overview of the information that a web-analytics program can provide. We will now discuss certain aspects of various components in greater detail.

As mentioned, client application 130 can provide varying levels of functionality. In one embodiment, it inserts tags into documents, which are often web pages. In some embodiments, these web pages are stored locally, that is, on client device 126 or a storage device coupled to client device 126, such as a network-addressed-storage device (not shown). In one embodiment, these local web pages can be modified by application 130, and then uploaded to web server 114. In other embodiments, application 130 interacts directly with web pages 118, modifying them on web server 114. In still other embodiments, although not shown, shadow or test files located on still another remote directory can be modified by application 130, again, working alone or in concert with server-side application 136. In yet another illustrative embodiment, content to be tagged can reside in memory (such as the memory of web server 114, and the web pages 118 can be modified on the fly. And as mentioned, not all web pages 118 need to be the object of instrumentation. Options are also available such as instrumenting an entire website, selected directories, selected files, one single file, a recurring HTML element on several pages, a single HTML element on one page, and the like.

Client application 130 can serve a variety of purposes. For example, a first illustrative purpose includes tag insertion. Tagging code 120 (or just "tags") are embedded into web pages 118 that are to be modified. In one embodiment, tagging occurs consistent with a set of predefined tagging rules, which in some embodiments reside on instrumentation server 138, and in other embodiments on tag repository 140, or web server 114 (as long as client application 130 knows of its location if rules are to be used). These set of rules are illustratively referenced by numeral 152 and illustratively shown in tag repository 140. The tags 120 that are to be inserted will compose a script in one embodiment, which will be made up of programmatic code in a scripting language. An illustrative scripting language is JavaScript.

Tagging code 120 will be inserted between comments, or markers, in one embodiment to simplify operations such as detection and replacement. This is not a requirement of all embodiments of the present invention. In some embodiments markers may not be included. But in other embodiments, markers are included so that the task of determining whether a page has already been instrumented, or inspecting a page for errors will be made easier. The process of tag detection is used to detect if a web page has already been tagged. Tagging may have been done manually, by another tool, or by a method such as that described herein. A goal of this aspect is to be flexible and to try to detect tagging, even if it is not exactly character-by-character identical to what is expected.

The process of tag deletion includes deleting tags 120 that have been entered into web pages 118.

Tag replacement allows tags 120 to be replaced with other tags. Different reasons exist as to why this might be desirable. A page might have been tagged with a previous version of tagging rules 152, and it is desired to update the tagging consistent with a newer version of the tagging rules. Alternatively, a user 126 may decide that a given page should be instrumented differently. Then again, user 126 may want to change the value of some of the parameters that make up embedded code 120. A replacement operation can be carried out as a deletion followed by an insertion in some embodiments.

Tag neutralization refers to the process of eliminating functionality associated with certain tags. Tags that have been added manually may be difficult to extract and delete. Thus, tag neutralization allows these tags to be disabled. In one embodiment, the tags to be neutralized are commented out.

Page verification allows for the verification that a page is lexically valid both before and after a tagging operation. That is, this aspect of the invention allows for verification that embedded content 120 operates the way that it should. In some embodiments, this process allows for the verification that the JavaScript or other code is not broken by the tagging operation.

Many different types of web pages 118 can be used in connection with various embodiments of the present invention. For example, valid HTML documents, or documents without fatal HTML errors, can be instrumented. In some embodiments, dynamic pages such as ASP, ASP.net, JSP, and PHP can also be used. Illustrative examples of errors that may warrant an increased level of inspection or possibly no tag insertion include situations where: the content of the document does not match a codepage in META tags; the document is not a valid UTF8 document; the document is not a valid UTF16 document; the document contains invalid characters (such as '0' chars); the document contains more than one <HTML> tag; the document contains more than one </HTML> tag; an </HTML> tag is located before an <HTML> tag; the document does not contain an </HTML> tag; the document does not contain an <HTML> tag corresponding to a </HTML> tag; the document includes more than one <HEAD> tag; the document includes more than one </HEAD> tag; the document does not include a </HEAD> tag; a </HEAD> tag is located before the <HEAD> tag; the document does not include a <BODY> tag; the document includes more than one <BODY> tag; the document includes more than one </BODY> tag; a </BODY> tag is located before a <BODY> tag; a </BODY> tag occurs after a <BODY/> tag; a <BODY> tag occurs before an <HTML> tag; a <BODY> tag occurs before a <HEAD> tag; a comment is not closed; a </HTML> tag occurs before a </BODY> tag; a <BODY> tag occurs before a </HEAD> tag; a </BODY> is not found; a close marker is found without an opening marker; an opening marker is found after an opening marker; a duplicate id is found; and/or the document is an unrecognized character set.

Tagging rules 152 define the operation of text detection, insertion or replacement, modification, neutralization, etc. that should be applied to a page if rules are opted to be used. In some embodiments, tagging rules 152 can reside in tag repository 140. A tagging library can be developed that includes a set of rules for different products used by customer 126 to instrument websites. In such an embodiment, a library of tagging rules, for different products (e.g., such as those offered by monitoring-service providers) and for different versions of the same product, can be stored and distributed to a central location in one embodiment. As mentioned, illustrative locations include tag repository 140, instrumentation server 138, or even web server 114. These rules 152 can be loaded and presented to a customer by way of user interface 132. They can also incorporate customer choices. This aspect provides flexibility and distinguishes over any art that blindly inserts code in fixed locations, such as just before the <\BODY> tag, such as the Perl script that is cited in an information disclosure statement that accompanies this application. Thus, as a result of customer choices, a different set of detection/replacement/insertion rules can be applied to each page of website 116. This set of rules 152 together with the web-page content provides input data for client application 130.

In some embodiments, an insertion rule includes an insertion point, an insertion location, a string to be inserted, and a rule identifier that can be used to easily detect a tag in the page after insertion. Regarding insertion points, an embodiment of the present invention assumes that an insertion point for instrumentation code 120 can be identified by either the name of a tag (for example, <BODY>) or the value of an attribute "id" associated with the tag. Alternatively, a first or a last tag can be identified with a name present in a web page 118. More complex insertion scenarios can be handled dynamically with bootstrap code that runs in client application 130 and accesses the Document Object Model of the web page 118 to be instrumented. The Document Object Model (DOM) is an API for HTML and XML documents. It provides a structural representation of the document, enabling modification of its content and visual presentation. Essentially, it connects web pages to scripts or programming languages.

Regarding insertion locations, insertion rules 152 will allow user 126 to insert text before, inside, or after a specified tag in some embodiments. In other embodiments, default rules can be chosen so that a user does not need to interact with the present invention beyond initiating it. In still other embodiments, suggestions can be made from which users can make a selection. For example, four illustrative selections that can be exposed to a user include "insert before start," "insert after start," "insert before end," and "insert after end." We will provide examples of each.

Figure 2:
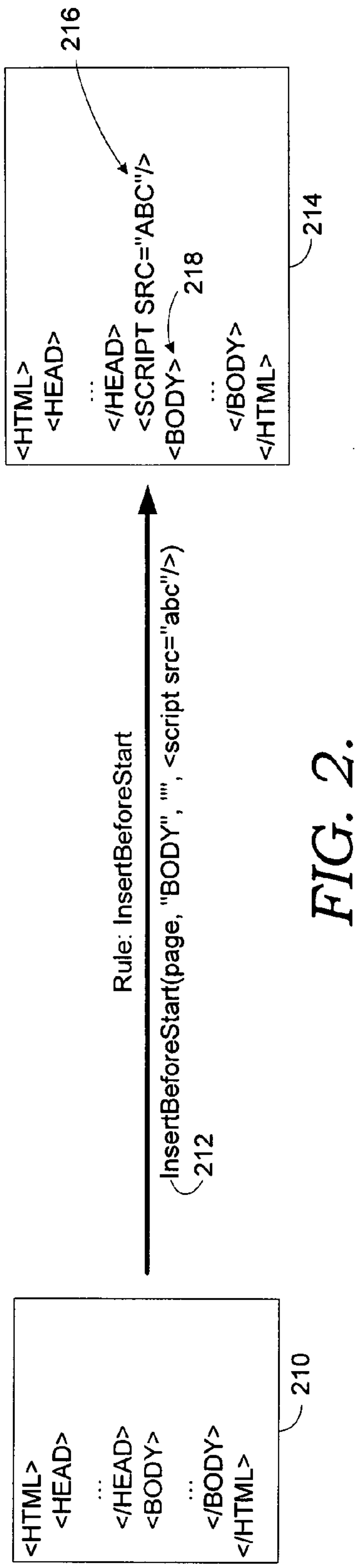
FIG. 2 depicts an illustrative implementation of an "insert before start" rule according to an embodiment of the invention.

"Insert before start." We will describe the "insert before start" rule with reference to FIG. 2. As shown, an initial code segment 210 is subject to the rule, which may take the illustrative form 212 to produce result 214. As can be seen in code portion 214, tag 216 was inserted before the start of the body of the HTML source code, which is indicated by reference numeral 218.

Figure 3:
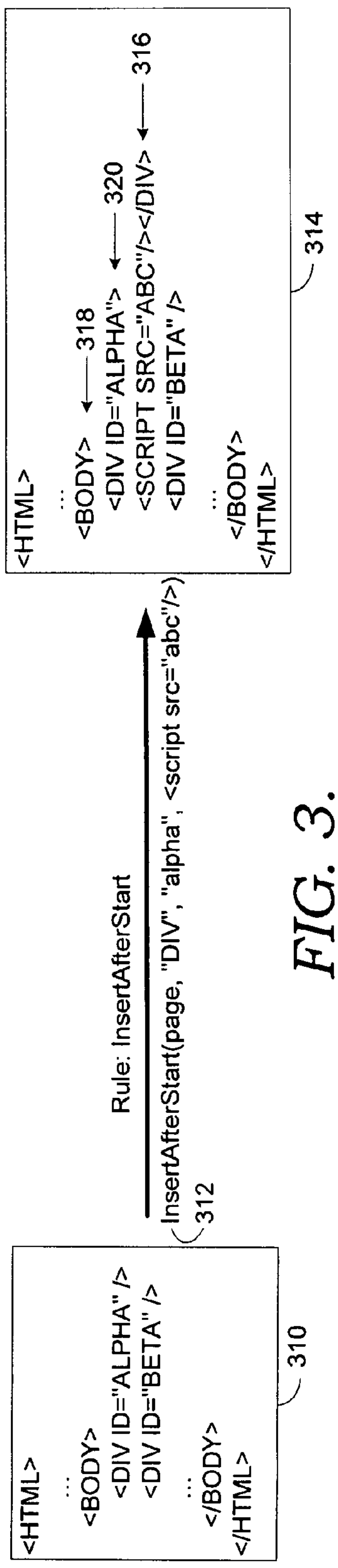
FIG. 3 depicts an illustrative implementation of an "insert after start" rule according to an embodiment of the invention.

The "insert after start" rule will be described with reference to FIG. 3. Turning to FIG. 3, an initial code portion 310 is subject to a rule that may take the illustrative form shown by reference numeral 312 to produce result 314. As can be seen, tag 316 is inserted after body tag 318 as well as a first <div> tag 320.

Figure 4:
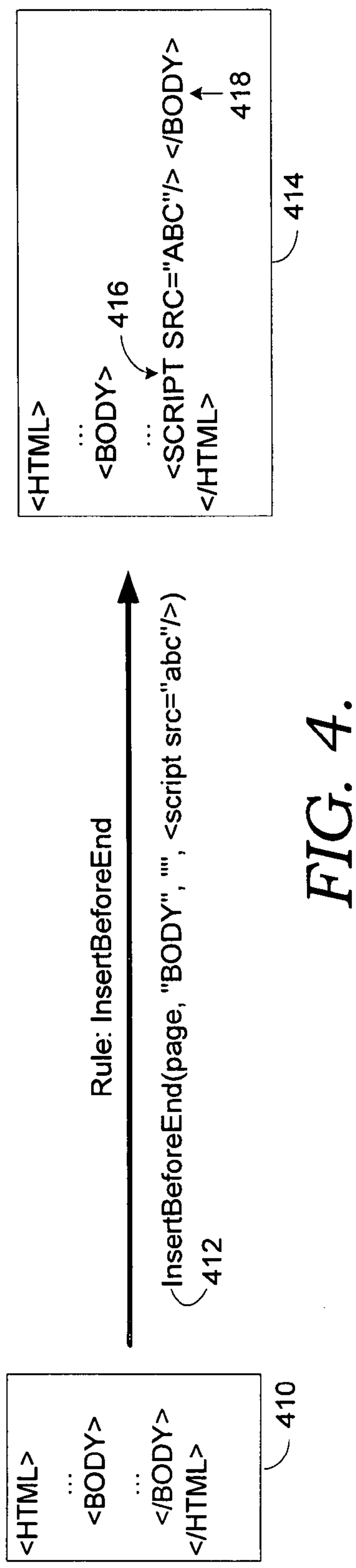
FIG. 4 depicts an illustrative implementation of an "insert before end" rule according to an embodiment of the invention.

An illustrative implementation of an "insert before end" rule will be described with reference to FIG. 4. Turning now to FIG. 4, an initial code portion 410 is subject to a rule 412 that has the illustrative format shown to produce a result 414. Illustratively, result 414 indicates that tag 416 appears before the end of the body portion of the HTML source code, as delineated by the relevant HTML <BODY> and </BODY> tags, that latter of which is represented by numeral 418.

Figure 5:
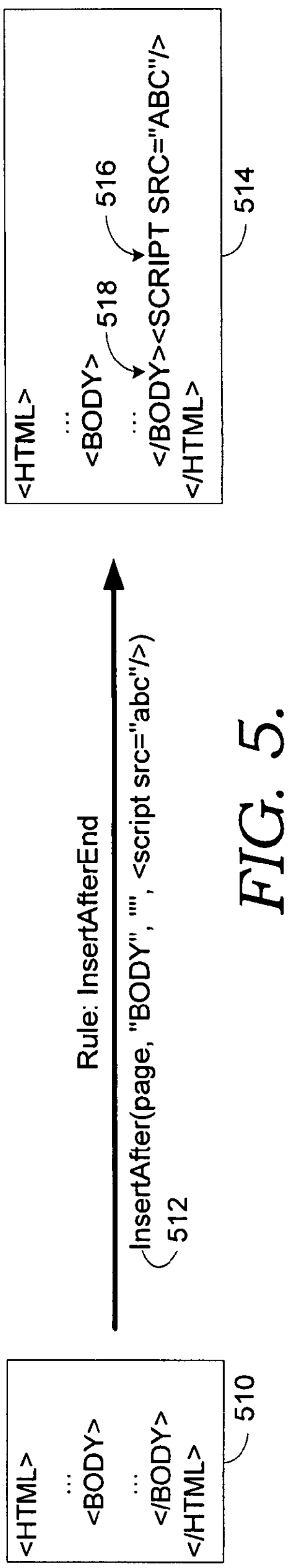
FIG. 5 depicts an illustrative implementation of an "insert after end" rule according to an embodiment of the invention.

An illustrative implementation of an "insert after end" rule will be described with reference to FIG. 5, wherein an initial code portion 510 is subject to a rule 512, which includes the illustrative format shown, to produce a result 514. As can be seen in result 514, tag 516 is inserted after an ending body tag 518.

Generally, in the case of tags insertion, an insertion point will be defined by the name of a tag, and optionally, the value of the "id" attribute. Thus, in some embodiments, all of the other non-"id" attributes of each tag can be discarded as well as the literal content inside HTML tags and the <script> tags.

Figure 6:
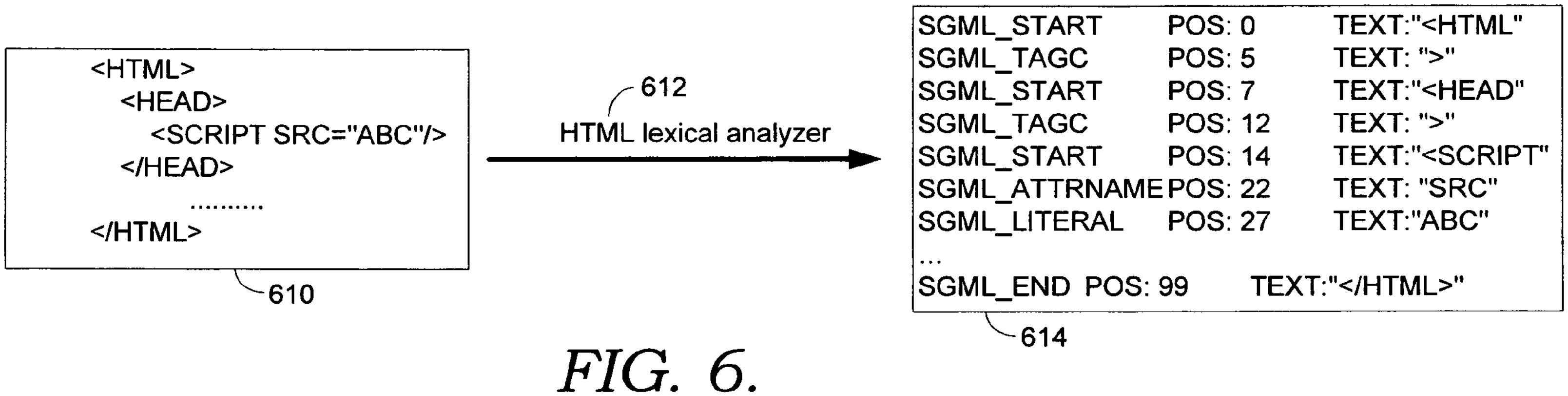
FIG. 6 depicts an illustrative result stemming from applying a lexical analyzer to programmatic code according to an embodiment of the invention.

A lexical analyzer can be utilized to produce a sequence of tokens. The lexical analyzer receives HTML text as input and will provide a sequence of tokens that correspond to the detection of an opening tag, a closing tag, an attribute name, an attribute value, a comment, and so on. The lexical analyzer can form a part of client application 130 or server-side application 136. With reference to FIG. 6, the fruits of applying an initial code portion 610 to a lexical analyzer 612 is shown in box 614. It is not necessary to verify that the page is syntactically correct, that all the open tags are closed, etc. Rather, an embodiment of the present invention will wait for a tag with a given name. When it is found, it is inserted into a queue along with information about the position of its opening and closing tag and the "id" attribute if present. At the end of the parsing, a determination can be made if there is an insertion point that satisfies a specified rule. If a tag is not found, the insertion fails in one embodiment. Otherwise, the exact position in the document is known as to where the tag will be inserted. This exact location can be passed as one of the parameters to an "insert" function.

Another parameter to an "insert" function is that of the "insertion rule id" that can be used to write a marker for the inserted code 120. This functionality may be useful to automatically update an older version of a custom script, to allow users to choose one instrumentation provider in place of another, or to facilitate A/B testing, which is a term that we use to describe one aspect of facilitating experimentation and variation of website topology and interaction; for example, exposing a first set of options ("A") to some customers but a second set of options ("B") to others, and using the instrumentation to evaluate a comparative efficacy of both options. An illustrative format for an opening marker is as follows:

"<!—[_{product}_{rule_id}_{version}_→·"

An illustrative format for a closing marker follows:

"<!—[_{product}_{rule_id}_{version}_→·"

These are mere examples. Other items could be included, such as a time stamp for an identifier, and some items removed, such as in the table below:

TABLE 1

| |
|---|
| Opening marker: <!--[{Unique identifier: GUID}{date in the format YYYY/MM/DD hh:mm:ss} --> |
| Closing marker: <!--]_<!--[{Unique identifier: GUID}_--> |

Figure 7A:
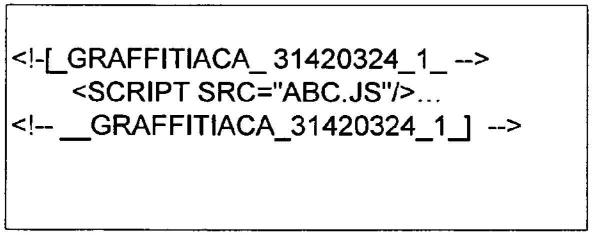
FIGS. 7A and 7B depict illustrative marking schemes according to embodiments of the invention.
Figure 7B:
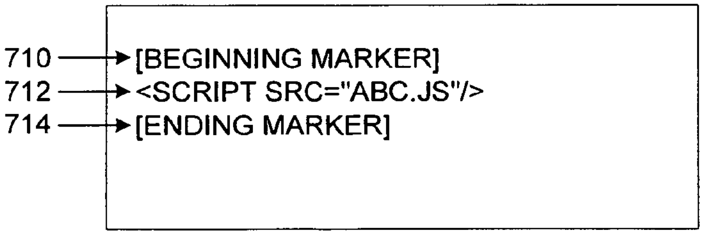

We show a more generic form of markers in FIG. 7B. But in the examples above, "product" is a fixed portion that identifies a product that is the subject of instrumenting (such as Google Analytics). "Rule_id" identifies a rule identifier, such as an integer that is provided by a configuration database. This can be retrieved from tag repository 140 in one embodiment. "Version" identifies a version in tag repository 140 of a rule 152 applied for instrumentation. An illustrative example is provided in FIG. 7A. And FIG. 7B illustrates a higher-level example, wherein a beginning marker 710 marks the beginning of embedded code 712 (or 120), and ending marker 714 marks the end. Detection and deletion of inserted tags 120 can be implemented using an HTML parser and looking for one or more comment tags that contain markers (such as 710 or 714) with the specified product and version. As mentioned, this provides an easy way to detect currently embedded tags.

Of course the above is merely one example of how to denote entered tags. There are a variety of different ways to denote tags, but what is comparatively more relevant is that in some embodiments tags are somehow denoted so that those notations can be searched for so that embedded tags can be easily found.

Regarding tag detection, we note that web-analytics instrumentation scripts can co-exist with other analytics products. In some embodiments, these cannot be inserted twice in the same page. In such embodiments, before inserting new tags in a page, it is fruitful to verify that such tags are not already present in a page. Pre-existing instrumentation may have been inserted manually, by the owner of the website content, or automatically by another tool, or even by client application 130 itself. Tags that are inserted as previously described are relatively easy to identify because they are surrounded by markers as previously mentioned. These markers define the boundaries of such tags, (e.g, 710 and 714). Thus, these type of tags can be found using a method that searches for the markers.

But in cases where markers or equivalents are not provided, the source code of a web page can still be inspected to see whether a "code signature" specific to a code portion to enter can be searched for. For example, certain web-analytics products bear a code signature. In the context of detection, it is not particularly important to perfectly define the exact boundaries of a code snippet. An illustrative code snippet follows:

"Script language=JavaScript" SRC=http://x.msn.com/scripts/acascript.js.

A goal is to correctly identify the right code snippet. To facilitate a desirable level of flexibility, a code signature can be specified through a regular expression. In such a scenario, the detection function will be implemented by applying a regular expression to the content of a page. The function will return a Boolean result "is tagged or not" together with information about the position of the tag code in the page if needed.

Regular expressions do not always work well in the context of web pages. The searched pattern may appear in many different places in a page. For example, the text <BODY> or </BODY> might appear in a string contained in a script tag before the actual body tag. This is shown in the table below:

TABLE 2

```
<html>
    <head>
        <title>...</title>
        <script language="javascript">
            var s = "<body>";
        </script>
    </head>
    <body>
    ....
    </body>
<html>
```

It may also occur inside an HTML comment, as shown in the table below.

TABLE 3

```
...
<!-- commented <body> tag. -->
<body>
    ....
</body>
...
```

To help avoid errors, some preprocessing steps can be carried out. Before looking for a regular-expression match, the page can be preprocessed to remove all the parts that can cause spurious matches. From an implementation point of view, a similar preprocessing scheme with different parameters can be used to implement any tagging operation, including detection, replacement, insertion, etc. Given a page to be tagged, the preprocessor will return a stripped version of the page that only contains the minimum set of tags and attributes that are required to apply the specific tagging operation. This stripped version will only be used internally in one embodiment to precisely detect the presence of a tag or to identify the correct insertion point and avoid possible false matches. The actual operations of insertion, deletion, replacement will be done on the original page.

In the case of detection, to find pre-existing instrumentation code, the pre-processing step will discard all of the comments as well as all literal content inside HTML tags in one embodiment. To make this process easier, page canonicalization can be employed. It is easier to canonicalize the string we match against so that the regular expression stays simpler. White spaces such as spaces, tabs, and new lines can be transformed into a single space during the preprocessing. Thus, lines that have various spaces in between expressions can be simplified so that they are separated only by a single space.

Regarding tag replacement or deletion, an HTML parser can be employed as previously mentioned to look for comments whose content match the text of a marker in cases where a marker was provided. When a match is found, all the markups that are included between two marker comments (such as 710, 714) can be removed from the page. The replacement of marked tags can be implemented by deleting all existing marked tags from the web page and then re-inserting, possibly in different positions or with different parameters, new tags.

For unmarked tags, an alternative process can be employed. Generally, the tagging of a single product (like Google Analytics, for example) generates a number of changes in different parts of a web page. These changes would need to be detected, and a set of regular expressions would be defined to specify the possible code snippets to look for. Thus, in one embodiment, a list of popular analytics programs can be inspected for code that is either unique to that provider's implementation or is found in other provider's implementations and serve as a good indicator that a phrase or term indicates the presence of a tag 120.

For example, consider the illustrative tag 162 of FIG. 1C. It can be seen that the phrase "URCHIN.JS" is present. This phrase, along with as many others as is desired to be searched on, can serve as the basis of a query to search for in a set of web pages. Because it is relatively difficult to actually remove all of the code associated with the snippet such as that of 162, such code is neutralized in one embodiment. For example, all of the calls to functions of known products can be commented out. Because there is a potential for essentially breaking a web page, one embodiment of the present invention provides the ability for a user to test his page before publishing it to ensure that it has, in fact, not been broken. Accordingly, in one embodiment, all changes that are made to specific web pages are tracked. These can then be cancelled and the original page can be restored in the event of an error.

Similarly, an HTML-verification process is provided in one embodiment. Such a process can verify the validity of an HTML document before and after a tagging operation. This can be used for testing purposes as well as to verify that the tagging has not broken a page, at least from the point of view of HTML syntax. This functionality can be implemented using the aforementioned HTML preprocessor/parser.

To explain a variation of preprocessing steps to carry out, the present invention can employ page or document encoding. Information of this is provided at microsoft.com/globaldev/getwr/steps/wrg_codepage.mspx, which is incorporated herein by reference to explain encoding, and is also provided in an IDS filed with this document. In such an embodiment, a codepage can be detected. This can be accomplished by detecting unicode BOMs (byte order marks) at the beginning of the document (see, e.g., unicode.org/unicode/faq/utf-_bom.html, which is incorporated by reference herein to explain detecting BOMs), looking for the presence of <META charset=" . . . "/> in the page, and/or even asking the right codepage to the user. After detecting, the page can be transformed into a normalized format such as Unicode UTF16. An HTML parser runs on the normalized version to help facilitate the insertion/deletion/modification of tags. If desired, a resulting (UTF16) document can be converted back to the original codepage.

Turning now to FIGS. 8A-8M, greater detail of user interface 132 is provided. In one embodiment, these are the screens that would be presented on client device 126 by way of browser 128. If client application 130 were a local application, then similar screens would be provided but not necessarily presented by way of a network browser 128, although they could be even if the application were a local, stand-alone application. Screen 8A depicts an illustrative welcome screen that user 126 would see in preparation to instrumenting a desired website, which for purposes of this example will be website 116, with pages 118 being a set of pages that either could or will be instrumented. As can be seen by item 810, this process allows for automatic instrumentation.

Figure 8A:
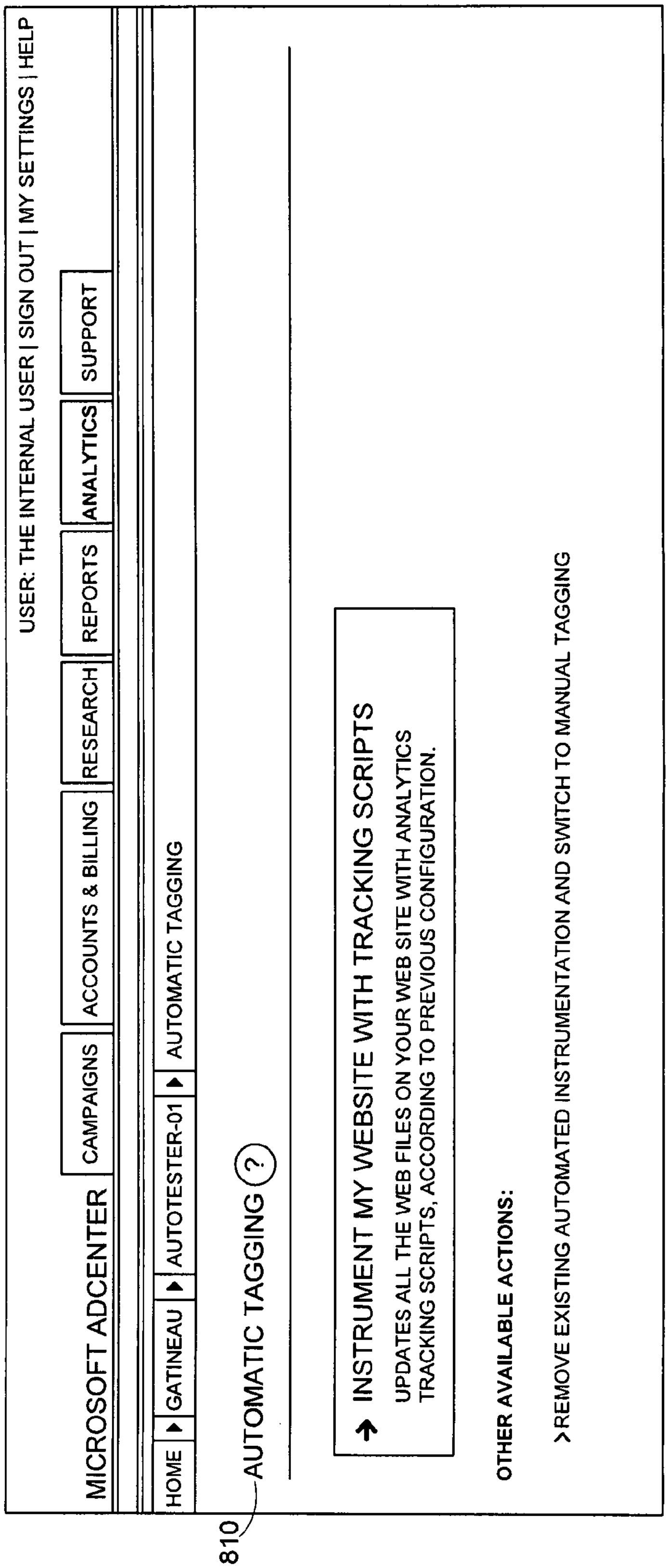
FIGS. 8A-8M depict illustrative screenshots of a user interface according to an embodiment of the invention.
Figure 8B:
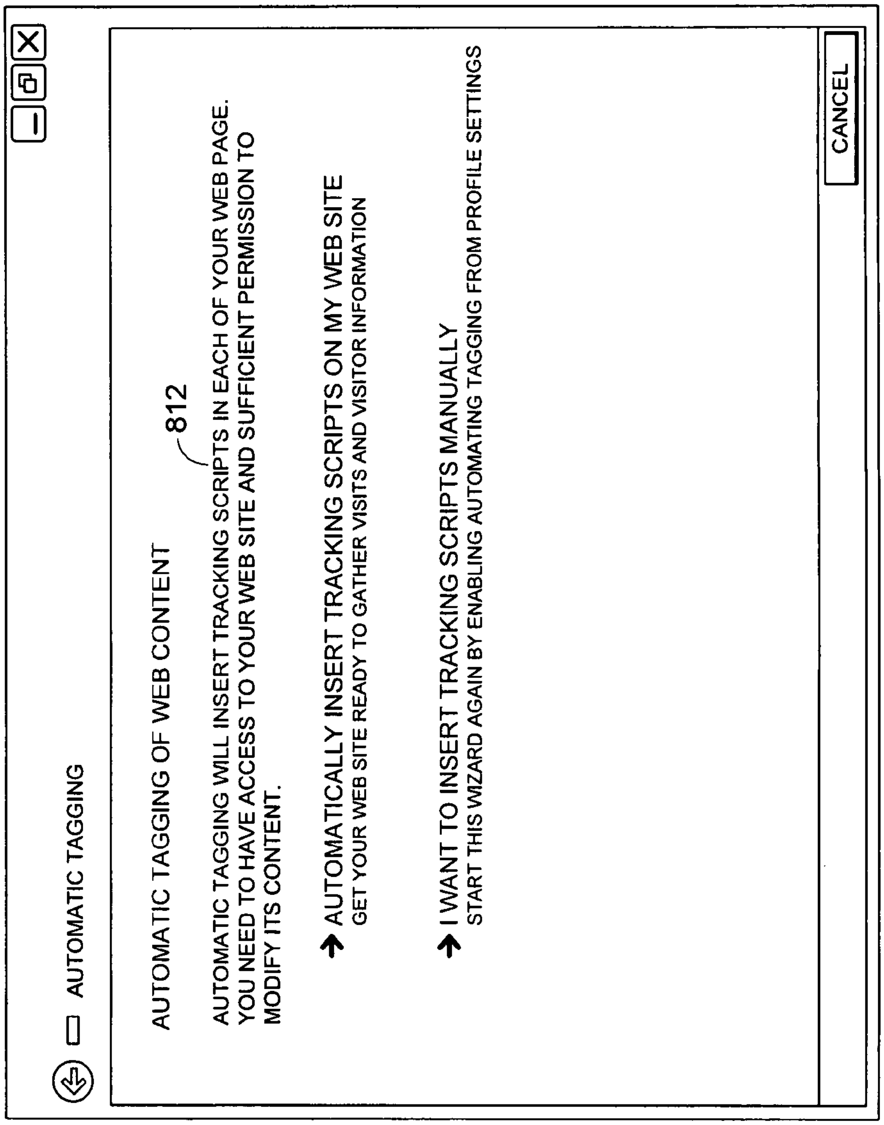
Figure 8C:
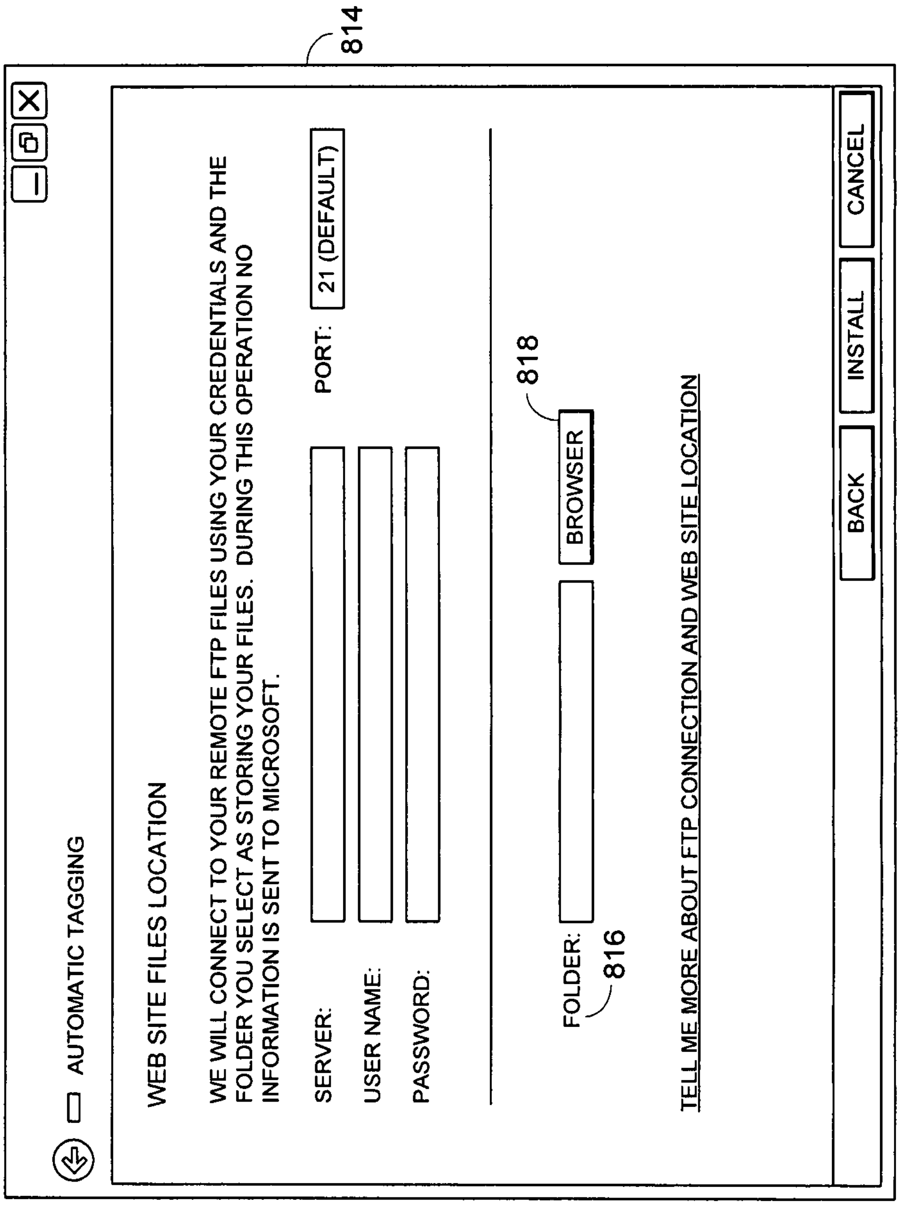

In one embodiment, another screen, as shown in FIG. 8B, can be presented to allow a user to select an option to automatically insert tracking scripts into potentially all web pages 118. As is shown in FIG. 8B by reference numeral 812, automatic tagging will insert tracking scripts in each web page if desired. Turning now to FIG. 8C, screen 814 provides a user interface to receive location information that enables identification of web pages 118. It is merely illustratively shown that an FTP paradigm can be used, wherein a server and security credentials are provided. But it may also be the case that a folder 816 can be browsed to by button 818 to receive location information that enables web pages 118 to be identified to be instrumented. Such a folder does not need to physically reside in the same piece of hardware as that of client application 130 or browser 128. Rather, it can be reachable by way of a network drive.

Figure 8D:
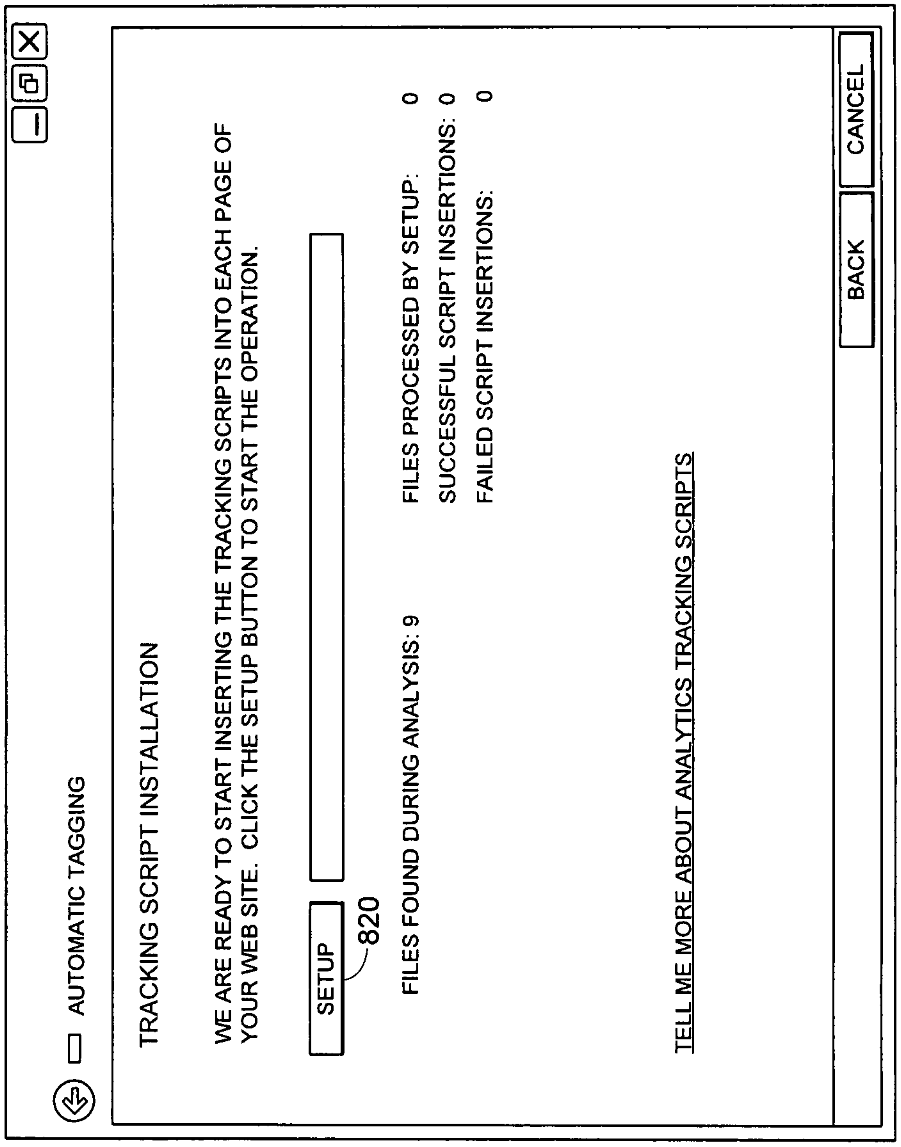
Figure 8E:
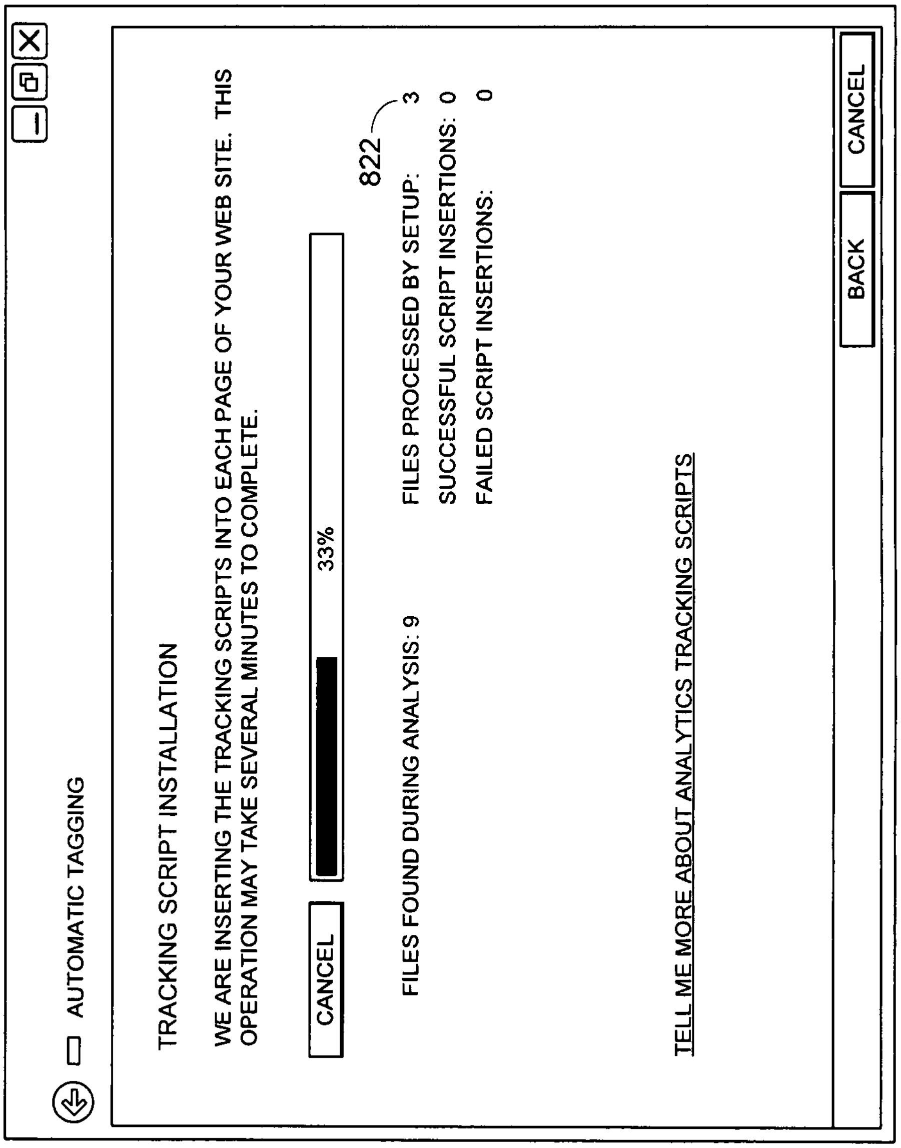

FIG. 8D indicates that the invention is ready to start inserting tracking scripts into each page of website 116. A setup button 820 is provided to allow greater customization of instrumentation such as those previously described and more. In FIG. 8E, it can be seen that the present invention is approximately 33% complete, having processed three files as indicated by reference numeral 822.

Figure 8F:
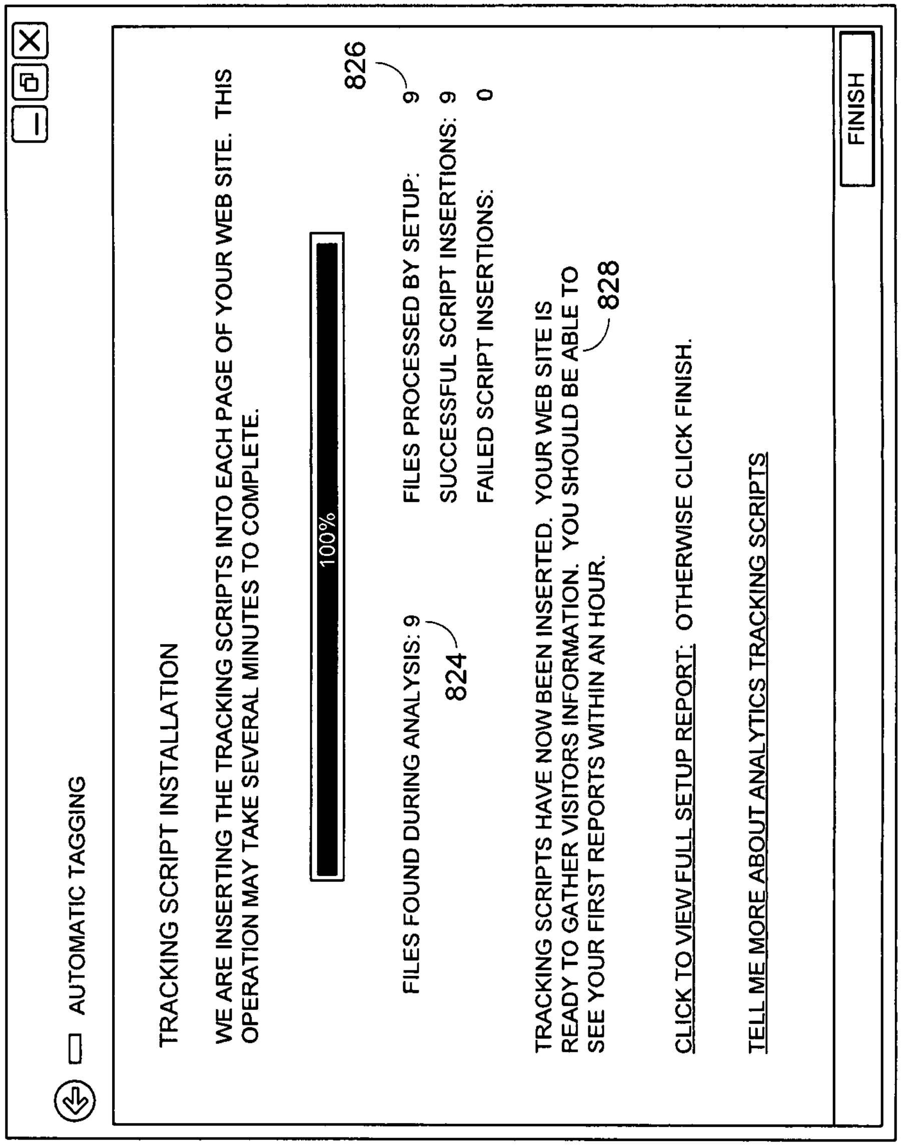

FIG. 8F depicts a screenshot showing that all nine files 824 were processed and tagged successfully embedded, which is reflected by reference numeral 826. As shown by comment 828, tracking scripts 120 have now been inserted such that website 116 is ready to gather visitor or user information.

Figure 8G:
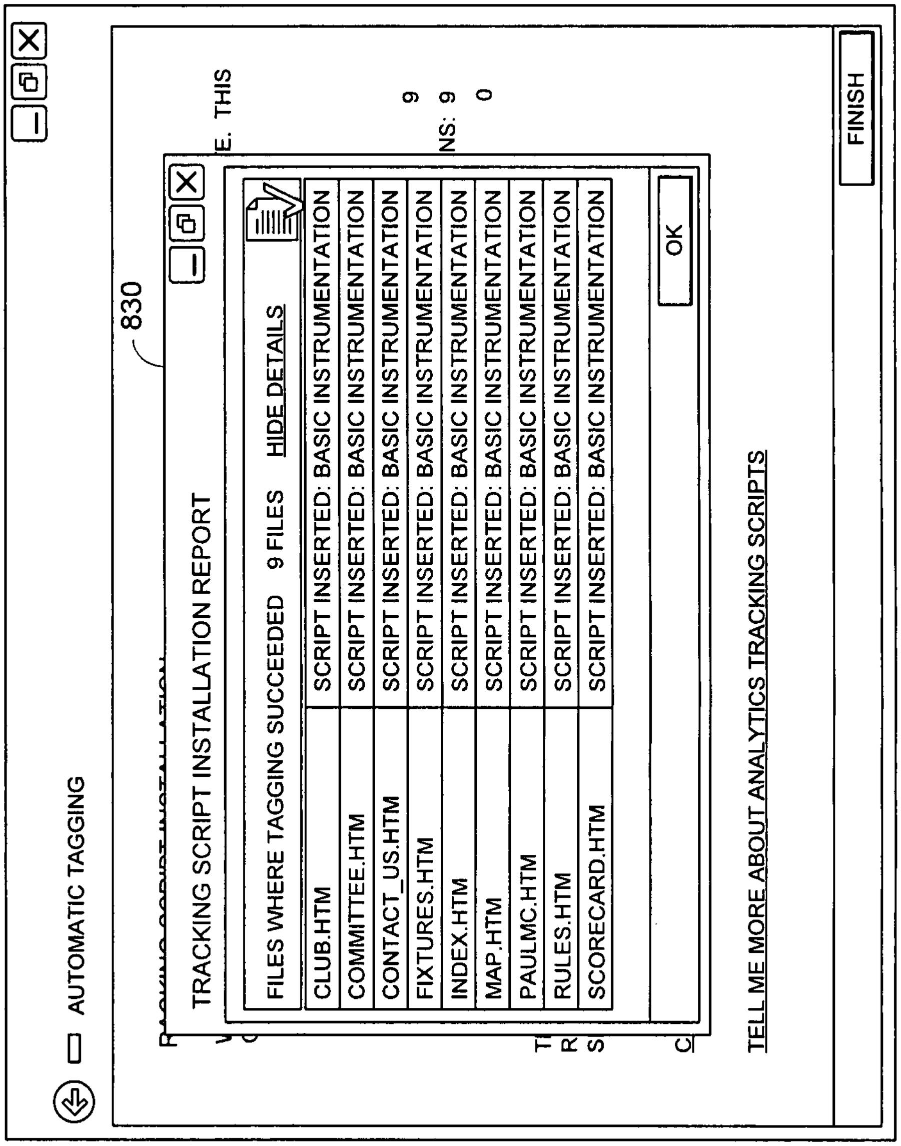
Figure 8H:
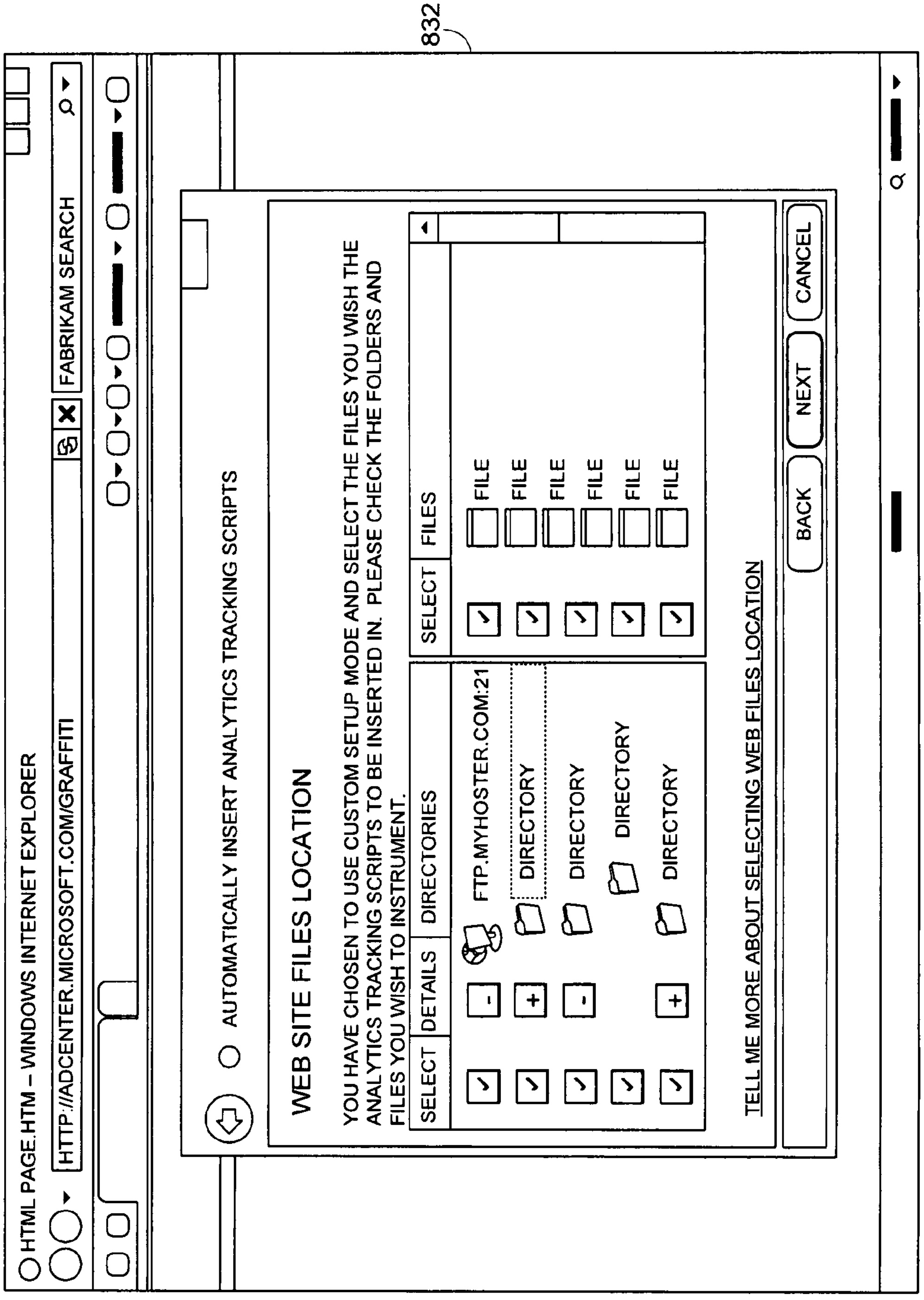

An illustrative tracking-script-installation report can be seen in FIG. 8G, which is referenced by numeral 830. This report shows each page as well as an indication of whether a script was inserted and optionally by what way, such as "basic instrumentation." FIG. 8H depicts a screen 832 that illustrates an ability of the present invention to allow custom setup and tracking scripts to be inserted. Here, a user is allowed to select certain folders and files to have custom content embedded in. The illustrative custom content shown is analytics-tracking scripts.

Figure 8I:
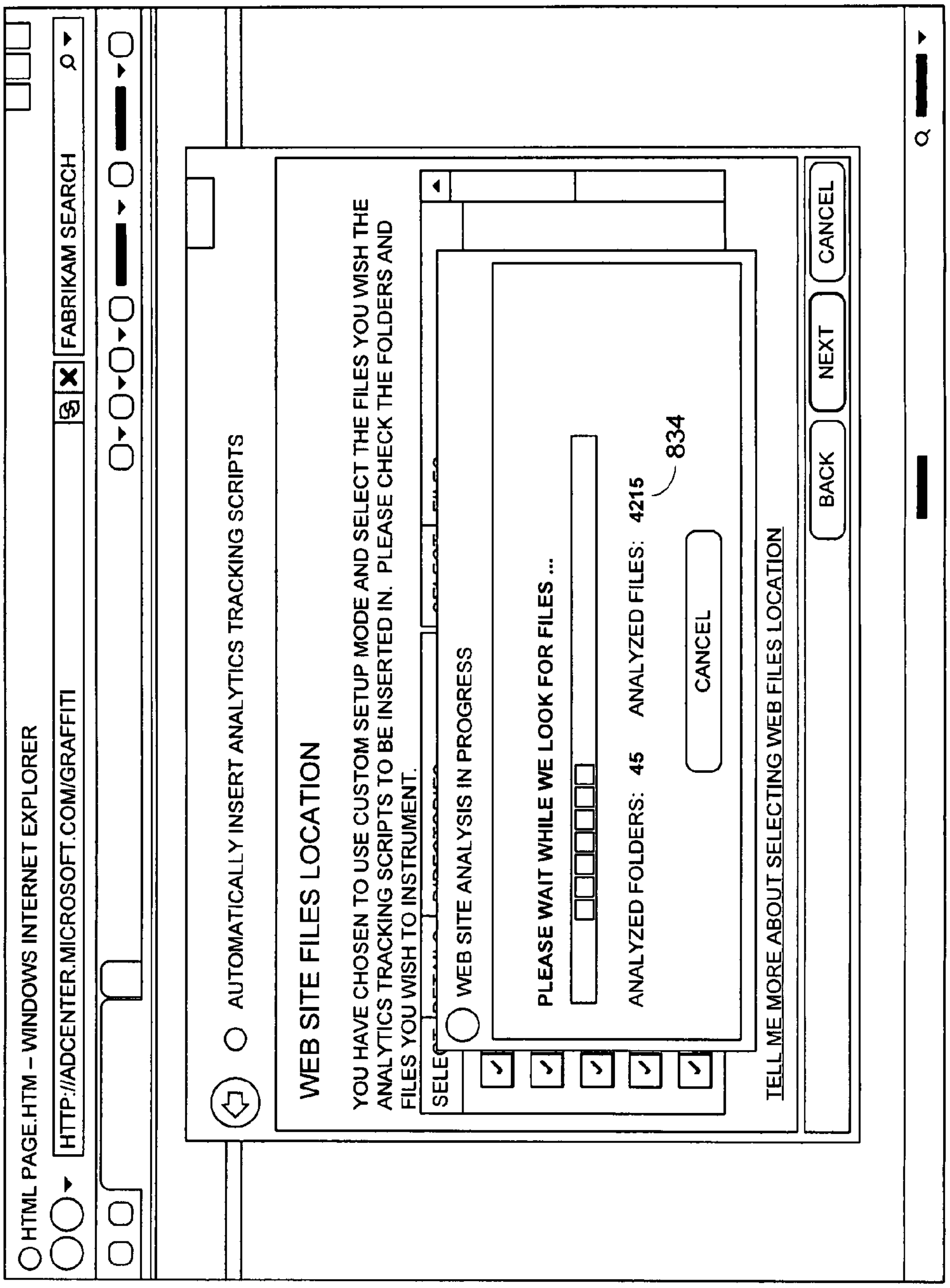

FIG. 8I indicates that the files in the indicated directories are searched for. As shown by reference numeral 834, 4,215 files are shown to have been analyzed.

Figure 8J:
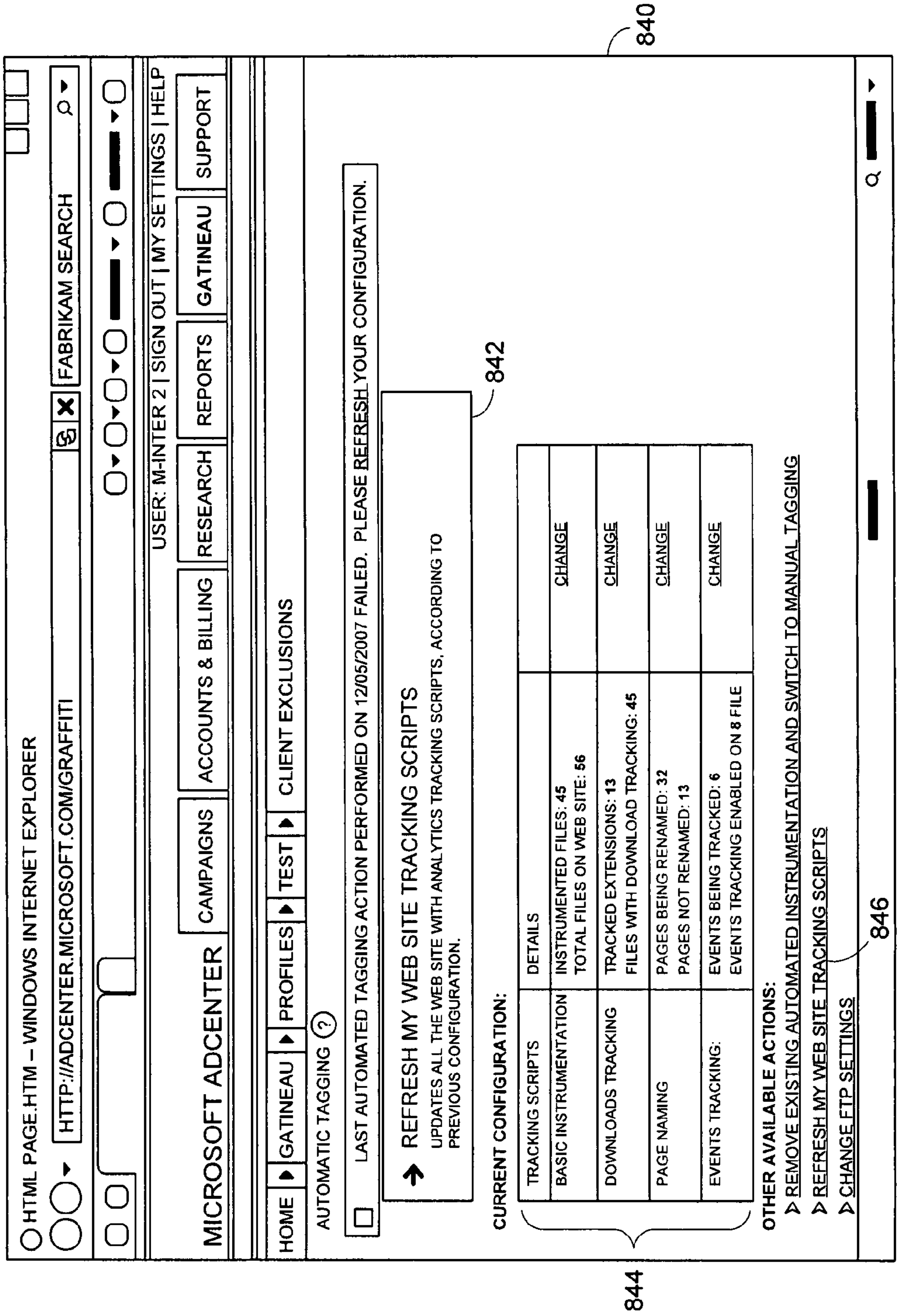

Turning now to FIG. 8J, a screen 840 of the user interface illustrates how options such as an ability to refresh a set of tracking scripts 842 is available to a user. Also shown are various features such as downloads tracking, page renaming, and events tracking 844 and they are available by an embodiment of the present invention. A user can click one link 846 to refresh his entire website with tracking scripts. Following such a link would allow all of the scripts that have been embedded in all of the pages to be refreshed according to, perhaps, a new set of rules defined in rules database 152.

Figure 8K:
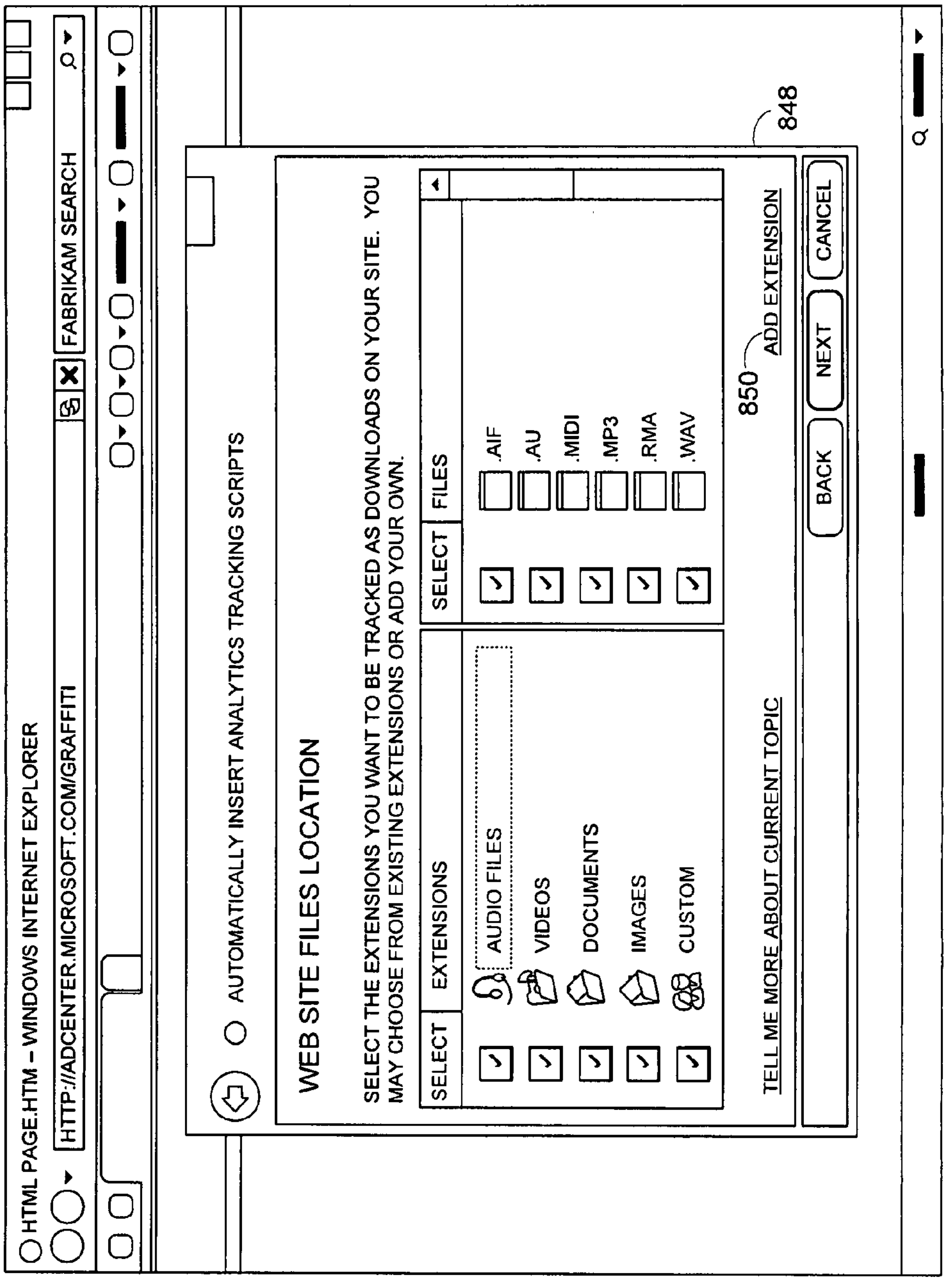

Aspects related to downloading files can also be tracked. Turning to FIG. 8K, a screen 848 shows that files with certain extensions or file types can be selected to be tracked as downloads on website 116. Moreover, a user is free to add additional files having customized extensions by following link 850. In this way, an embodiment of the present invention allows for downloads to be tracked.

Figure 8L:
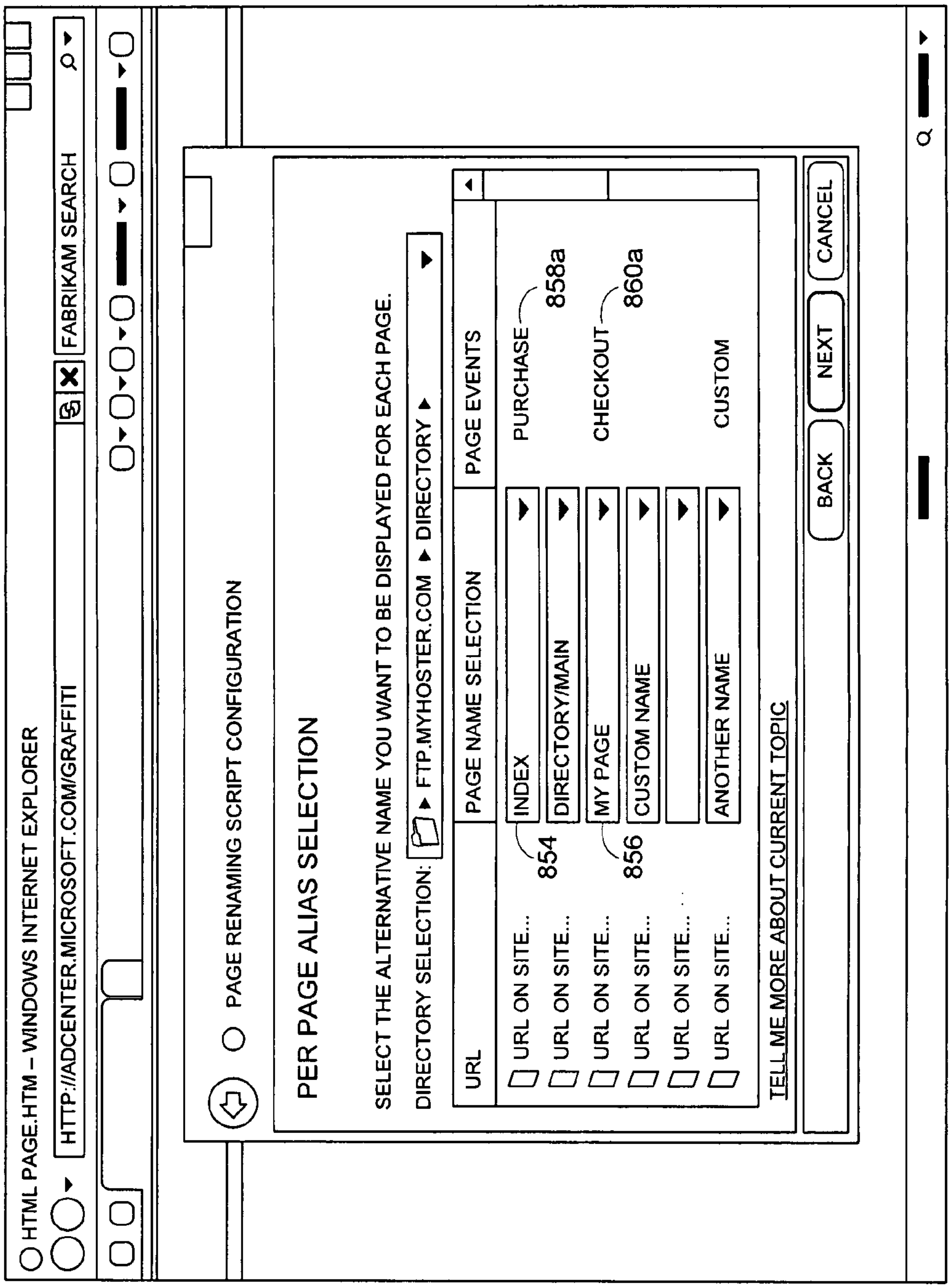
Figure 8M:
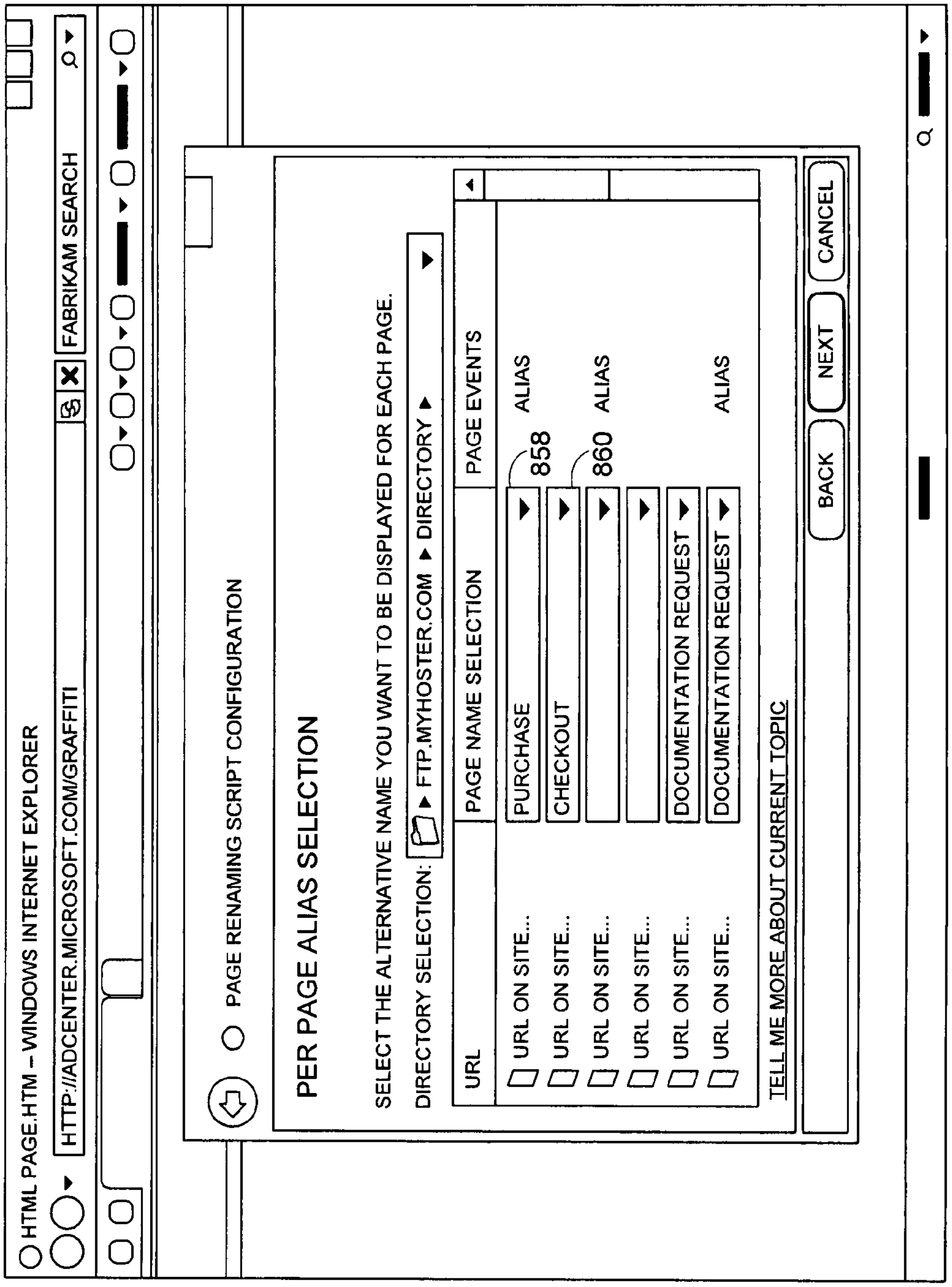

Another illustrative feature of the present invention is shown in FIG. 8L. Here, "per page alias" selection can be made. This allows files with potentially long file names to be renamed with an alias or nickname that is easier to work with. Illustrative page names that are shown include "index," and "my page," shown by numerals 854 and 856, respectively. These pages can be renamed as shown in FIG. 8M. Note in FIG. 8M that item 858 is now associated with an alias "purchase" which was the desired name change, as shown in FIG. 8L by numeral 858A. Similarly, item 860 in FIG. 8M is renamed "checkout," as can be seen with reference to item 860A in FIG. 8L.

To recapitulate embodiments of the present invention provide an extensible set of embedded services that can be included. The invention facilitates modifying a set of web pages so that content ads can be displayed in the highest number of locations. Also, in the gadget/widget market, some make a business model out of embeddable content such as web 2.0 items. An embodiment of the invention enables such items to be easily and automatically embedded. In a community-type context, community content generates more visitors if it is distributed in third-party web content (e.g., Flickr images, Soapbox videos, LiveEarth maps, and the like).

Analysis of HTML content is also provided to determine what embedded services can be included: Embodiments of the invention enable for each target content an analysis of the compatibility with the requested embedded service.

Tag customization is also made possible. Each tag 120 may contain parameters that can be customized. Embodiments of the present invention expose a user interface that helps a content publisher 144 or 126 to adapt the embedded services to their needs.

Tags 120 insertion in the right location in the HTML file is also provided. The invention can detect the right location(s) in the target content 118 to insert the tags 120. Alternatively, for specific type of contents 148 and/or 142, an embodiment of the invention can expose a way for user 126 to visually select the location. For example, in embodiments where advertising-content-related code 148 is to be embedded, an embodiment of the present invention can receive user input that either confirms or dictates an insertion point for the code 148/120. Because this type of insertion will usually change the layout of the page, an embodiment includes the option of presenting a preview of what the modified page will look like. The user can review the layout of a page after the ad is inserted.

User-configuration information can be stored for each embedded service and web destination or other location information. This makes updating easier. Illustrative configuration information stored, perhaps in tag repository 140, includes selected embedded services, user parameters, target content, page-specific information and the like.

Additional features can also be provided. Illustrative other features include subscription to proposed embedded services (utilizing a common user identifier across various services such as email, analytics and the like); synchronization (verifying that the current tagging implemented in the web content matches the tagging that the user required in the customization); refresh (automatically updating the web content with the configuration required by the user); and removal (removing some or all the "embedded tags" from the website). These features are illustrative in nature, and do not compose an exhaustive list, as is the case with other lists contained herein.

As previously mentioned, embodiments of the present invention can take on a variety of implementations. Illustrative implementations include taking the form of an online tool, a web content building tool plug-in, a web-server enhancement, a content-editing platform extension, and/or a software developer kit (SDK).

Figure 9:
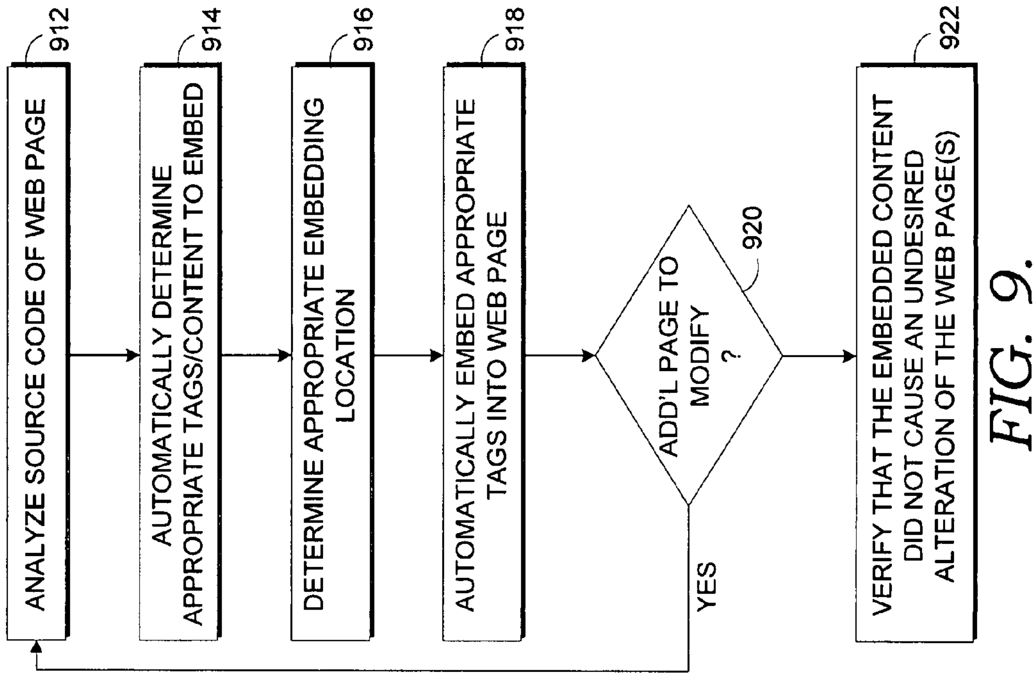
FIG. 9 depicts an illustrative method for embedding custom content according to an embodiment of the invention.

Turning now to FIG. 9, an illustrative process according to an embodiment of the present invention is provided. As a preprocessing or precursor function, location information of a website to be outfitted with instrumentation and/or embedded-content tags is received. The URL of a website, a folder location, IP address etc., may already be known by the system, or it can receive the data from a user. The source code of a first web page is analyzed at a step 912. Analyzing the source code of a web page may actually include various substeps including analyzing a copy of the web page, or a stripped version of the web page as previously mentioned. At a step 914, a determination of an appropriate tag to embed is automatically made. In some embodiments, an appropriate tag is a default tag to be entered. In other embodiments, user-provided information is considered to determine an appropriate tag to embed. In still other embodiments, an advertising-content code portion is determined at this stage. At a step 916, an appropriate embedding location is determined. This process has been previously described above. With a tag determined and insertion point known, the tag or tags are automatically embedded into the web page at a step 918. This process can continue for as many pages as are to be instrumented. Thus, at a step 920 a determination is made as to whether there are any additional pages to instrument. If so, processing reverts to step 912. If not, the process may end in one embodiment.

At a step 922, a verification step can occur that allows for the verification that the embedded content did not cause an undesired alteration of the web page(s). If the content that was added was an analytics script, then the appearance of the web page should not have changed. A comparison of the way that the web page appeared before the insertion and after the insertion can be made. This can occur in a variety of ways. In one embodiment, size or other dimensions of the web page can be before insertion as well as after insertion. If any variance is beyond some threshold, then an assumption can be made that an undesirable change has occurred. If advertising content was added, then, provided the size of the advertisement was known, then another sizing comparison can be made. For example, if an add was 60 pixels high, then the height of the web page can be checked to see if it increased by 60 pixels. In still another embodiment, a preview of a change can be presented to a user to receive an indication of whether there is any noticeable change. Exposing that option to a user is valuable. Functional checks can also be made. Adding analytics code or advertising content should not alter the function of a web page, at least as observed from a viewer's 124 perspective. Things such as links and media renderings can be automatically tested, as well as the rendering of the entire page.

We also previously explained aspects of verification earlier (see the section describing document encoding). In some embodiments, the invention does not explicitly check to determine if the inserted code 120 breaks aesthetics or existing functionality per se. In these embodiments, a check is performed on the DOM to analyze if the existing DOM remains the same after an operation of adding and then removing the script. Recall that a Document Object Model (DOM) provides a structural representation of a document. The checks performed ensure that what is already in the page before the insertion is not broken as a result of the insertion. For example: if a click on a button in the page changed the source of an image on the same page, then automatically adding tracking script 120 will not break that existing functionality. Also adding tracking script 120 does not change the layout of the page. Generally, changes do not occur to the rendering, interaction, and data/application functionality of the page. But adding an advertisement script will change the layout of the page. Even so, an embodiment of the invention ensures that the functionalities existing on the page prior to insertion are not broken.

Changes may be made to the instrumentation functionality. "Rendering" refers to the visual layout and appearance of the page. "Interaction" refers to the behavior coded into the page for things like JavaScript mouseover events, form controls, etc. (options are legion). "Data/application" refers to the actual work the page does, e.g. process an ecommerce transaction, retrieve a user's account balance from a database and show it to them, etc.

One way of testing for errors or developing an exclusion rule includes inserting tags into a set of pages (maybe thousands or millions), and then removing them. A byte by byte and DOM comparison can be done on the page. If one of the comparison fails to return equal results, the tagging is considered as failed, at least to that page. The failed tagging page can be saved and its content analyzed to identify what error in the page broke the tagging. If a work around is know, the a tagging fix can be created. If there is no work around the we add the page error as one of the exclusion rules.

An alternative way is to tag on the fly random pages that are browsed. All such pages are tagged. Later, they are untagged. A comparisons is made and action take as explained above.

Figure 10:
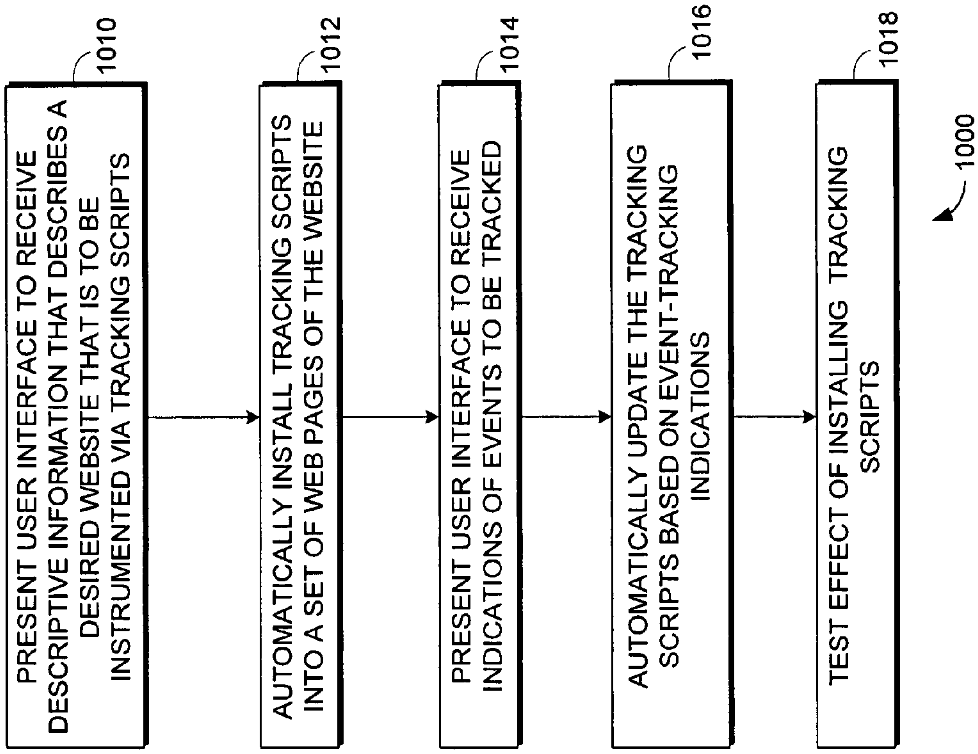
FIG. 10 depicts a second method according to another embodiment of installing tracking scripts according to an embodiment of the invention.

Turning now to FIG. 10, another method for practicing an embodiment of the present invention is provided and referenced generally by the numeral 1000. In this embodiment, at a step 1010, a user interface is presented to a user to receive descriptive information that describes a desired website that is to be instrumented via tracking scripts. In one embodiment, such a user interface may take the form of one or more screens of FIGS. 8A-8M. At a step 1012, tracking scripts are automatically installed into a set of web pages of the website. As previously mentioned, locations can be determined and scripts can be selected automatically, without user intervention, and embedded. At a step 1014, a user interface is presented to receive events to be tracked. These steps do not need to occur in any certain order. In some embodiments, it is helpful to have scripts embedded in web pages before different parameters associated with those scripts are received. In other embodiments, these steps can be consolidated or even reversed in order such that a user interface is presented to a user to receive indications of events to be tracked even before the tracking scripts are installed. And after those indications of events to be tracked are received, then the tracking scripts are installed. Examples of a user interface to receive indications of events and the like to be tracked can be found in screens 8H, 8J, 8K, 8L, and 8M.

At a step 1016, the tracking scripts that were entered can be automatically updated based upon event-tracking indications. Thus, in this embodiment, a user may make additional changes, which are reflected in updated scripts that are again updated automatically without user intervention.

At a step 1018, the effects of installing the tracking scripts can be tested. This process is similar to that of 922 in FIG. 9 in one embodiment.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for execution by a computing device for automatically configuring a plurality of web pages to track web-page usage information ("usage information"), the method comprising:

analyzing, by way of the computing device, the plurality of web pages to determine a set of web pages that have a structure that supports inserting a tagging structure that facilitates tracking the usage information; and for each web page of the set of web pages:

(1) based on the analysis, automatically identifying an insertion point to insert the tagging structure that facilitates tracking the usage information, (2) verifying that inserting the tagging structure into the identified insertion point does not alter the appearance of the web page, wherein the verifying includes comparing a rendering of the web page before inserting the tagging structure with a rendering of the web page after inserting the tagging structure, and (3) upon verifying that the inserting does not alter the appearance of the web page, automatically embedding the tagging structure at the insertion point, wherein usage information about the web page is able to be tracked.

2. The method of claim 1, wherein said analysis facilitates automatically identifying a tagging structure from a plurality of possible tagging structures to embed in the web page that was analyzed such that different web pages may receive different tagging structures.

3. The method of claim 1, wherein the analysis of the a plurality of web pages includes an analysis of one or more documents to determine if they include an unrecoverable HTML error, and if so, performing one or more of the following:

presenting an indication of the unrecoverable error;

abandoning tagging; and performing a default operation.

4. The method of claim 1, wherein the tagging structure includes a code portion delimited by an opening tag marker and a closing tag marker.

5. The method of claim 1, wherein the tagging structure can receive parameters based on user input or configuration.

6. The method of claim 5, wherein the script facilitates experimenting user interaction with varied web-site topology, and wherein the experimenting includes one or more of:

A/B testing; and multivariate testing.

7. The method of claim 1, wherein automatically embedding the tagging structures includes embedding the tagging structures subject to a set of accessible rules.

8. The method of claim 1, further comprising providing for a verification that the embedded tagging structure did not cause an undesired alteration of the web page with respect to its functionality before embedding the tagging structure.

9. The method of claim 1, further comprising:

presenting a user interface that allows the tagging structures to be modified by way of providing data to the user interface, thereby not requiring a user to edit source code of a web page; and automatically modifying the tagging structures incident to receiving input by way of the user interface.

10. The method of claim 1, further comprising gathering user-configuration information and storing it in a repository for future recollection.

11. The method of claim 1, further comprising:

storing change information that describes changes made to the web pages; and facilitating an undo process that reverses any changes made by utilizing the change information.

12. The method of claim 1, further comprising inspecting the web page for currently present tags, and updating or deleting those tags, wherein the tags include tags other than those embedded by the method of claim 1.

13. One or more hardware memory devices having computer-executable instructions embodied thereon for performing a method of automatically instrumenting a plurality of web pages, the method comprising:

automatically determining a set of web pages that are to be modified to receive customized content;

for each web page of the set of web pages, (1) automatically analyzing the web page to determine an appropriate tagging structure from a plurality of tagging structures that should be embedded into the web page, (2) automatically parsing the web page to determine an insertion point in the web page without requiring altering the functionality of the web page, wherein the insertion point is based on one or more of configuration information and rules associated with the web page, and (3) verifying that inserting the tagging structure into the identified insertion point does not alter functionality of the web page, wherein the verifying includes determining that the web page is lexically valid both before and after inserting the tagging structure, and (4) upon verifying that the inserting does not alter the functionality of the web page, automatically embedding the appropriate tagging structure at the insertion point, thereby enabling said customized content to be embedded into said web page.

14. The one or more hardware memory devices of claim 13, wherein the computer-executable instructions make up one or more of:

a web-based client application; and an addition to a stand-alone, non-web-based application.

15. The one or more hardware memory devices of claim 13, wherein the tagging structure facilitates one or more of:

tracking visitation events associated with the web page;

presenting advertising content;

conducting A/B testing; and conducting multivariate testing applied across a specified set of documents.

16. The one or more hardware memory devices of claim 13, wherein automatically embedding the appropriate tagging structure includes referencing a repository that stores configuration information or rules associated with the web page that is to have the tagging structure embedded within it.

17. A system for automatically embedding content tags into a web page so that its content is modified in real time as a request is made to view the web page, the system comprising:

a server that hosts a website that includes a set of web pages whose content is to be modified to receive embedded content in the web pages;

a storage repository that is coupled to the server and that stores configuration information that respectively associates tagging information with each web page in the set of web pages; and a memory that provides access to a set of computer executable instructions that provides an ability to identify insertion points to automatically insert the embedded content tag into the web pages at respective insertion points without requiring altering an appearance or function of any web page in said set of web pages, wherein automatically inserting the embedded content tag into the web pages at the respective insertion points is based on the stored configuration information, and wherein inserting the embedded content tag without requiring altering an appearance or function of any web page includes determining that a Document Object Module for the web page is unchanged after inserting and then removing the embedded content tag.

18. The system of claim 17, wherein the embedded content includes one or more of advertising content;

web analytics that allow information about visitation events of the website to be gathered;

media such as videos, Images, audio, maps, cartoons from specialized websites, and slideshows;

programmed content such as including, for example, applets, flash objects, embedded, and instant-messaging services;

website gadgets such as guest books, surveys, and news presentation; and

Web 2.0 items such as tag clouds, RSS feeds, and wikis.

19. The system of claim 17, further comprising a notification component in communication with the server and with the storage repository that, incident to a request to view a certain web page, references the storage repository to retrieve tagging information associated with the certain web page, and automatically inserts the tagging information in real time at an insertion point such that the said certain web page is presented to a requester with the tagging information embedded.

20. The system of claim 17, wherein the storage repository stores one or more of:

services available for embedding;

tags for each embedded service;

tag information on location in files including required and optional parameters;

types of parameters that can be included in the embedded content;

specific formatting requirements;

rules for validating web pages;

rules for determining insertion points;

rules for embedding content;

parameterization options for the embedded content; and tags-configuration information for one or more of the web pages.

21. The system of claim 17, wherein one or more of the respective insertion points are determined, at least in part, by receiving input from a user.

* * * * *